United States Patent
Parr

(10) Patent No.: US 10,841,002 B2
(45) Date of Patent: *Nov. 17, 2020

(54) LOW DATA VOLUME SATELLITE COMMUNICATION SYSTEM

(71) Applicant: eSAT Global, Inc., Solana Beach, CA (US)

(72) Inventor: Michael Parr, Solana Beach, CA (US)

(73) Assignee: eSat Global, Inc., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,722

(22) Filed: Jan. 29, 2019

(65) Prior Publication Data

US 2019/0173573 A1 Jun. 6, 2019

Related U.S. Application Data

(63) Continuation of application No. 15/683,645, filed on Aug. 22, 2017, now Pat. No. 10,193,616.

(51) Int. Cl.
| | |
|---|---|
| *H04B 7/26* | (2006.01) |
| *H04W 88/04* | (2009.01) |
| *H04L 1/16* | (2006.01) |
| *H04B 7/185* | (2006.01) |

(52) U.S. Cl.
CPC ....... *H04B 7/2656* (2013.01); *H04B 7/18513* (2013.01); *H04L 1/1692* (2013.01); *H04W 88/04* (2013.01)

(58) Field of Classification Search
CPC ............................. H04B 7/2656; H04W 88/04
USPC ........ 455/452.1, 509, 3.01, 67.11, 427, 12.1, 455/428, 430, 422.1, 446
See application file for complete search history.

(56) References Cited

U.S. PATENT DOCUMENTS

| | | | | |
|---|---|---|---|---|
| 7,187,926 | B1* | 3/2007 | Henkel | H04B 1/74 455/12.1 |
| 2001/0052134 | A1* | 12/2001 | Cunningham | H04N 21/6187 725/121 |
| 2006/0053436 | A1* | 3/2006 | Allwein | H04N 7/17309 725/1 |
| 2010/0098245 | A1* | 4/2010 | Fang | H03M 13/2903 380/38 |
| 2010/0122143 | A1* | 5/2010 | Lee | H03M 13/1117 714/752 |

* cited by examiner

*Primary Examiner* — John J Lee
(74) *Attorney, Agent, or Firm* — Innovation Law LLP

(57) ABSTRACT

Systems are disclosed for a communication system optimized for low data volume communications. In embodiments of the invention, a terminal in the communication system is configured to communicate with a satellite and a terrestrial hub using the same communications architecture, such as an air interface. In embodiments of the invention, the terminal sends a burst comprising a message to network infrastructure at a pre-scheduled time such that the network infrastructure can derive a terminal identity for the terminal by the time of the burst without having to include terminal identity information in the message. The terminal can communicate with the network infrastructure either through the satellite or through the terrestrial hub.

20 Claims, 16 Drawing Sheets

LOW DATA VOLUME SATELLITE COMMUNICATION SYSTEM

BACKGROUND

The present invention relates generally to the field of satellite communication systems. More specifically, the present invention relates to embodiments of satellite communication systems suited to low data volume communications.

A conventional Mobile Satellite System (MSS) can be configured to provide services, such as voice and packet data communication throughout the world. Referring now to FIG. 1, a typical MSS 100 comprises one or more geostationary satellites 102, one or more Gateway Stations (GS) 104, and one or more Satellite Terminals (ST) 106. The STs 106 can include mobile terminals (handsets), vehicle terminals, and/or fixed terminals. The GS 104 can be configured with external interfaces to existing fixed telecommunication infrastructure as well as to the wireless telecommunication infrastructure. For example, a GS 104 may interface to a Public Switched Telephone Network (PSTN) 108. The subsystems in Gateways can be oriented to various types of transmission functionality, e.g., circuit-switched or packet-switched. The names of the subsystems vary between implementations. The term for all the ground-based subsystems is Network Infrastructure 110, which includes the GS and PSTN subsystems in FIG. 1. The satellite directs energy in the forward link to areas on the ground called beams 112. The same concept of beam-forming is applied in the return link to separately capture the signals from terminals in each beam at the satellite.

Information is communicated in finite duration transmissions called bursts. Bursts are composed of: waveforms related to physical layer functions such as detection and synchronization (e.g., pilot signals); and waveforms that contain modulated data. The modulated data includes payload fields and error detection fields (e.g., CRC). The payload fields may contain control information (such as terminal identity), and application-related information. Any payload information that is not application-related is defined as an overhead.

Information can be transmitted via these satellites 102 using a Common Air Interface (CAI). Existing satellite CAIs typically concentrate on efficient operation for relatively large quantities of data. For example, a voice call lasting one minute might involve 30 kB (kilo-Bytes) or more of information transmission in each direction. Packet data operations often involve even larger quantities of data, frequently in the MB (Mega-Byte) range. Providing a connection in a conventional MSS typically involves a sequence of steps including:

Requesting and establishing a link between a ST and network infrastructure via a satellite;
Exchanging information characterizing the capabilities of the end points;
Exchanging information describing the objectives and configuration of the connection;
Transmitting the data and related acknowledgements; and
Exchanging information to terminate the connection.

Prior to transferring information, an ST 106 typically must "register" with the network. In addition, the ST 106 typically must "re-register" when it moves from one satellite beam to another. When an ST is registered, the network infrastructure is aware that the ST is present, and the beam within which that ST can be located. After a ST is registered, data exchanges can proceed. A conventional MSS data exchange may start with establishing a communication channel. This may include sending a Random Access Channel (RACH) burst from a ST 106 to a satellite 102, which passes the RACH burst to a gateway 104. The RACH burst might include source information, such as a called party, terminal identity (ID), terminal capabilities, the message intent (such as establishing a packet connection) and possibly location information. Next an Access Grant Channel (AGCH) burst may be sent from the gateway 104 to the ST 106 to establish a bidirectional traffic channel for further exchange of information. A typical AGCH burst can provide other information, such as an indication of available resources for the ST 106. Security information may be exchanged back and forth between the gateway 104 and ST 106. Further capability information, such as maximum data rate, may also be exchanged between the gateway 104 and ST 106.

After a communication channel is established, data may be sent between the ST 106, satellite 102, and gateway 104. The data may be sent in multiple messages. Each message includes header and protocol overhead, which will vary in quantity depending on the scenario, and can amount to approximately 20% of the message. Acknowledgement messages (ACK) are also sent to acknowledge the successful receipt of the data messages. If, the data messages are not successfully received, a Non-Acknowledgement message (NACK) is sent and the data message(s) are resent.

After data communications are complete, the ST 106 will send a "done" message to the satellite 102 which gets passed on to the gateway 104 and, if the "done" message is successfully received, a termination message is sent to the ST 106 acknowledging receipt of the "done" message. For large quantities of data, the exchanges other than "transmitting the data", can correspond to a reasonable overhead. However, for smaller data exchanges, the overhead can significantly impact efficiency.

SUMMARY OF THE INVENTION

One embodiment of the invention relates to a communication system, comprising at least one terminal in wireless communication with network infrastructure, wherein the at least one terminal is configured to communicate with the network infrastructure by sending a burst comprising a message at a pre-scheduled time such that the network infrastructure can derive a terminal identity for the at least one terminal by the time of reception of the burst without having to include terminal identity information in the message. The pre-scheduled time for sending a burst can be part of pattern of pre-scheduled times at which the at least one terminal sends bursts, with the pre-scheduled times in the pattern being set a fixed period from each other. The network infrastructure can consists of at least one network hub and a central server.

The time-framing of an ST-transmitted burst can be derived from waveform patterns that are associated with the payload of the burst. The time-framing of transmission from the network infrastructure can be derived from waveform patterns that are associated with the Broadcast Control Channel (BCCH) bursts.

The communication system may also comprise at least one terrestrial hub in wireless communication with the at least one terminal and central server to provide an alternative communication path between the satellite terminal and central server. In this case, the satellite terminal receives messages from the satellite but sends the bursts to the terrestrial hub which passes information from the bursts on to the central server.

At least one satellite relay may also be included in the satellite communication system. The satellite relay communicates with the satellite and the terminal and provides an alternative communication path between the terminal and the satellite for situations in which the terminal may be shadowed from the satellite. The satellite relay can be configured to receive a burst from a terminal, apply a frequency offset to the burst, and then forward the frequency offset burst to the satellite. The satellite relay can also be configured to receive a message from the satellite, apply a frequency offset to the message, and forward the frequency offset message to the terminal.

The network infrastructure can be configured to determine the success or failure in reception of a burst from a satellite terminal and, in response, send an acknowledgement message back to satellite terminal. The acknowledgement message may consist of either an ACK indicating successful reception of the burst, or a NACK indicating failure of reception of the burst. The energy required to transmit the acknowledgement message can be set to be different depending on whether the acknowledgement is an ACK or a NACK. For example, the energy required to transmit the acknowledgement message can be zero (or negligible) if the acknowledgement message is an ACK.

The network infrastructure can also be configured to send broadcast system information to every terminal in communication with the satellite. The broadcast system information may comprise a variety of information including an update to the pre-scheduled time that the terminal sends the burst, an indication describing whether or not a communications channel is shared with other services, network information describing multiple networks in which the terminal may communicate, or control information including a location in time of higher-power frames. The update to the pre-scheduled time that the terminal sends the burst may be sent in response to unexpected situations in which the satellite is operating near capacity. If that is the case, the broadcast system information may include parameters for determining a delay to be applied to the pre-scheduled time to avoid the unexpected capacity issues being experienced by the satellite.

Another embodiment of the invention relates to a method for communicating in a communication system having at least one satellite terminal in wireless communication with network infrastructure, the method comprising the at least one terminal waking up at a pre-scheduled time, the at least one terminal acquiring and synchronizing to a forward link channel of the communication system, the at least one terminal sending a burst comprising a complete message at a pre-scheduled time such that the network infrastructure can derive a terminal identity for the at least one terminal based on the time of reception of the burst without having to include terminal identity information in the message, and the at least one terminal going back to sleep after the burst is received by the network infrastructure. Time-framing of the burst can be derived from information supplied in the payload of the burst. The terminal may be configured to repeating the waking up, acquiring and synchronizing, and sending steps based on a pattern of pre-scheduled times a fixed period from each other.

Further features of the present invention, its nature and various advantages will be more apparent from the accompanying drawings and the following detailed description.

DETAILED DESCRIPTION OF THE PREFERRED EMBODIMENTS

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of or combination with some or all of the described or illustrated elements. Wherever convenient, the same reference numbers will be used throughout the drawings to refer to same or like parts.

Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Further, the present invention encompasses present and future known equivalents to the components referred to herein by way of illustration.

Embodiments of the subject invention can be configured to communicate small quantities of data much more efficiently than a conventional MSS. In one embodiment, information transmitted between terminals and network infrastructure is sent in bursts that are intended to communicate a complete message without all the overhead used in establishing and terminating a connection associated with convention satellite communication systems. The bursts are sent in predetermined formats, at predetermined times so that the identity of the terminal can be easily determined eliminating the need for much of the overhead of a conventional MSS.

Figure 1:
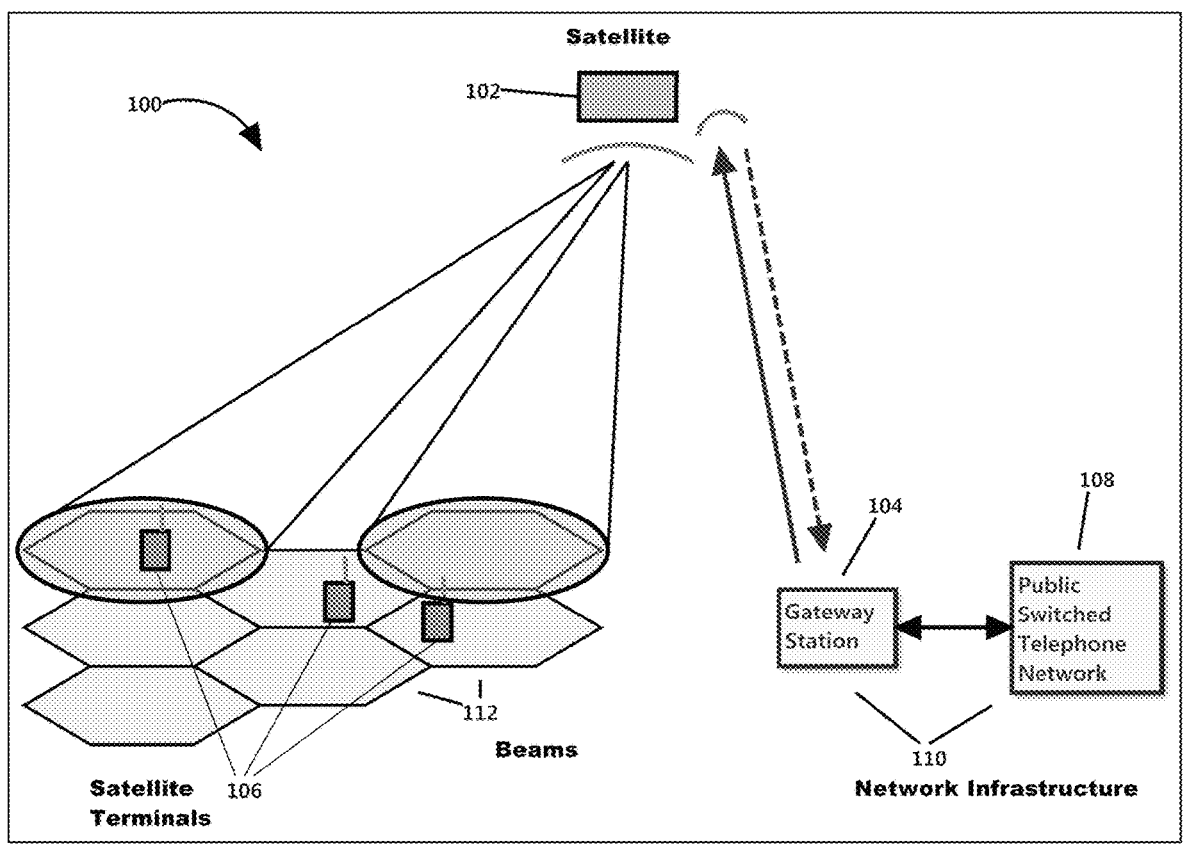
FIG. 1 is a schematic diagram of a conventional Mobile Satellite System (MSS).
Figure 2:
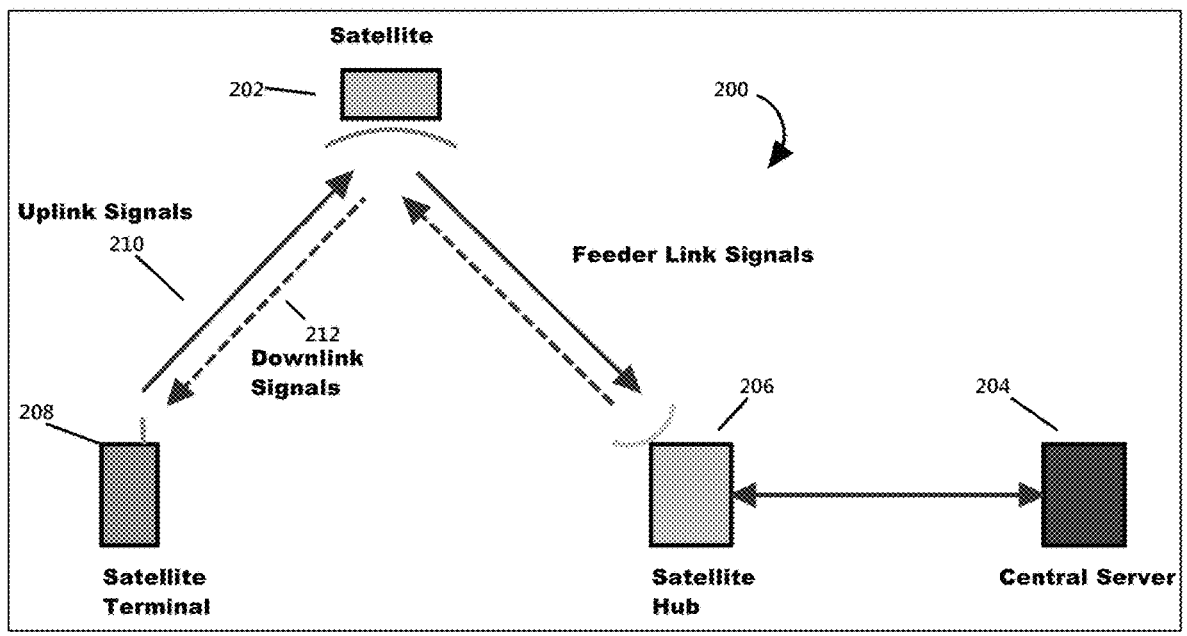
FIG. 2 is a schematic diagram of one embodiment of a satellite communication system according to the present invention.

As shown in FIG. 2, an exemplary low data volume satellite communication system 200 can comprise at least one satellite 202, at least one satellite terminal 208, and network infrastructure which can include at least one ground-based satellite hub 206, and a central server 204. Communication signals can be passed in both directions between the satellite 202 and satellite terminal 208 with uplink signals being sent from the satellite terminal 208 to the satellite 202 and downlink signals being sent from the satellite 202 to the satellite terminal 208. In fact, many satellite terminals 208 may be connected via each satellite link. The satellite 202 can also be configured to pass communications signals to and from the ground-based satellite hub 206 and the satellite hub 206 can be configured to pass data to and from the central server 204.

Figure 6:
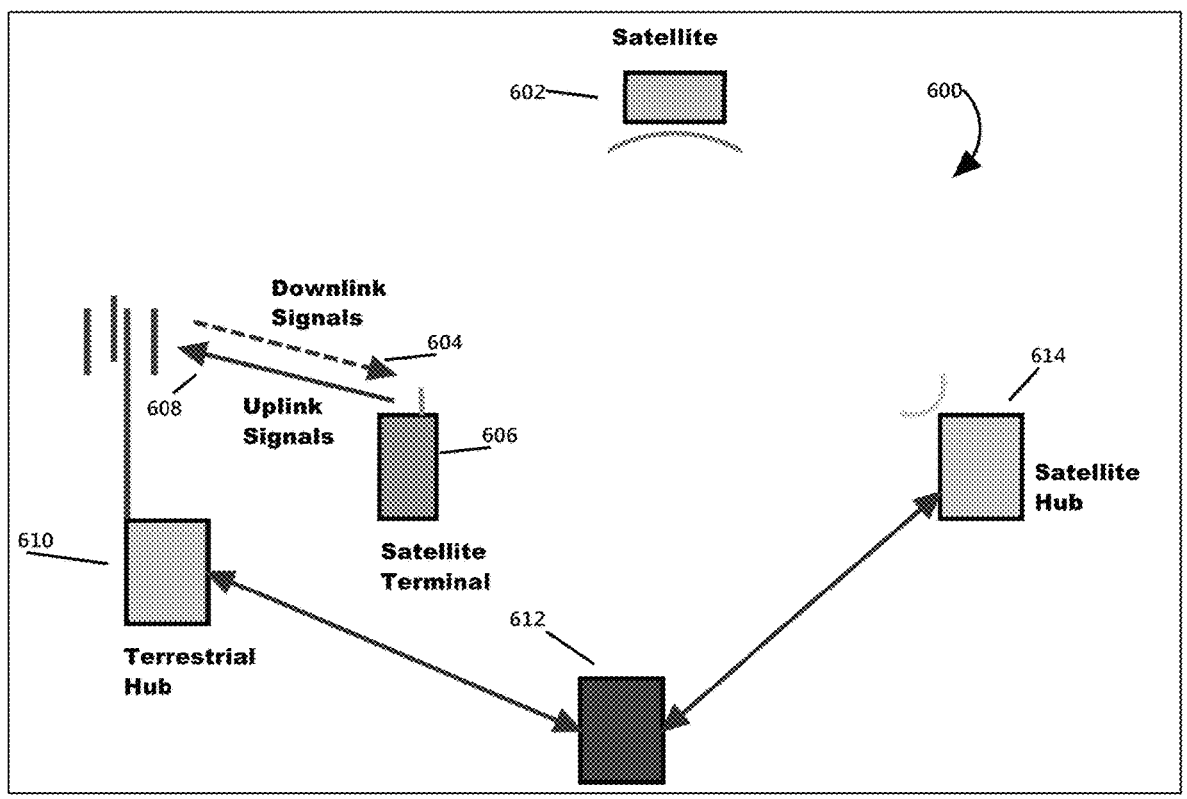
FIG. 6 is a schematic diagram of another embodiment of a satellite communication system according to the present invention showing an alternative communications arrangement with a terrestrial hub.

Satellite terminals 208 may comprise communications devices capable of transmitting information to, and receiving information from, network infrastructure via a satellite 202. Satellite terminals 208 may also be configured to communicate directly with network infrastructure as shown in FIG. 6, such as the ground-based terrestrial hub 610, using the same channels. Downlink signals can be sent to a satellite terminal 208 using a forward link 212 and uplink signals transmitted from the satellite terminal 208 can be transmitted using a return link 210.

A satellite 202 can provide services across a set of channels within an area on the surface of the earth, or above it, called a beam. For example, within each beam, a forward link 212 Broadcast Control Channel (BCCH) can provide system information to satellite terminals 208. A pilot channel can provide a known waveform that enables detection of waveforms and a reference for demodulation of other bearers. A separate paging channel (PCH) can be used to transmit requests for connectivity to satellite terminal 208. ACK and power control channels can also be transmitted in the forward link 212 in response to bursts sent from satellite terminals 208. Traffic channels (TCH) can be used in both the forward 212 and return 210 links to convey payload information. A RACH can be used by the satellite terminals 208 to request establishment of a connection. Actual communication links can operate at different data rates. The lowest rate (which provides the highest link margin) can be supported by the most robust (or nominal) burst format.

Support for multiple networks, such as multiple satellite operators, and support for evolution to future networks can be included in embodiments of the invention. In one embodiment, this support can be implemented using the broadcast system information. The system information can be used to convey network information. As such, a terminal 208 may receive the information needed to operate in a different or new network via the system information. The system information can also be used to provide physical layer flexibility in a satellite terminal 208 via software-defined radio features in the satellite terminal 208. Support for multiple data rates can also be provided. In one embodiment, different transfer rates can be configured by using Walsh codes to change the length of sequences used in information spreading, while all data rates share a common transmission structure so they can operate simultaneously.

Figure 3:
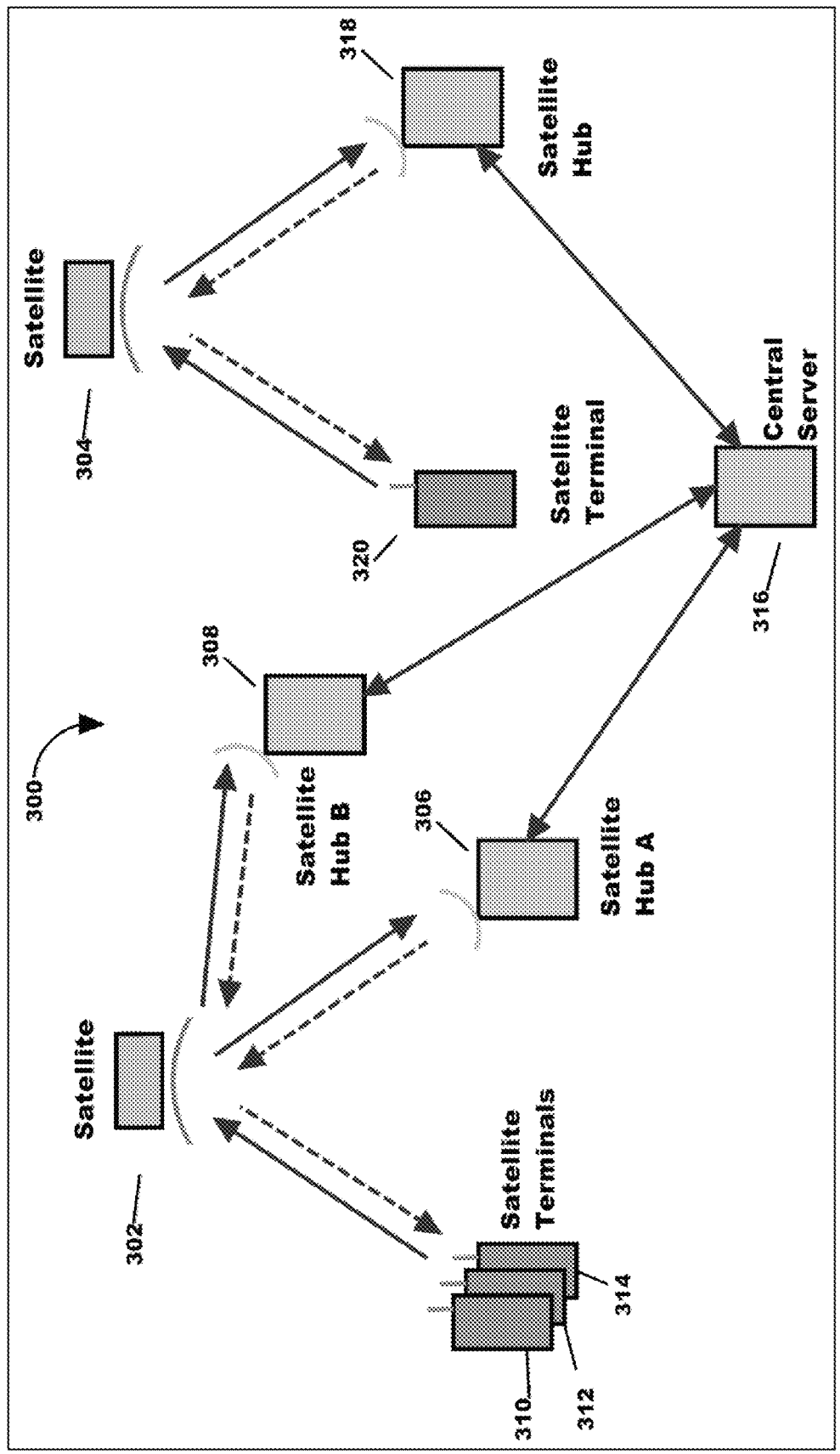
FIG. 3 is a schematic diagram of another embodiment of a satellite communication system according to the present invention showing multiple satellites in the communication system.

FIG. 3 illustrates another embodiment of the invention showing a network 300 with multiple satellites 302 and 304. Satellite 302 is configured to communicate with multiple satellite hubs 306, 308 and multiple satellite terminals 310, 312, 314. The satellite hubs 306, 308 are also configured to communicate with a central server 316. The central server 316 is also configured to communicate with satellite hub 318, which is connected to satellite 304. Satellite 304 is also connected to satellite terminal 320. As can be seen, the embodiment shown in FIG. 3 consists of a network 300 having several hubs 306, 308, 318 and several satellites 302, 304.

The communication links between satellite terminals and a satellite, for example, satellite terminals 310, 312, 314 and satellite 302, can use multiple sets of resources which can be characterized by a set of parameters. For example, the parameters could define carrier frequencies of all usable channels, chip rates, channel filtering, etc. When a fixed group of parameter settings is used in communication with a satellite, the associated link is termed a space relay. It is possible for multiple space relays (with different parameter settings) to operate over a single satellite. A set of space relays using the same parameter settings is usually termed a network. A system may contain multiple networks, where those networks could use different parameter settings.

As mentioned briefly above, embodiments of the invention can be configured to communicate small quantities of data much more efficiently than a conventional MSS by transmitting information in prescheduled bursts that are intended to communicate a complete message without all the overhead used in establishing and terminating a connection associated with conventional satellite communications systems. The burst transmission configuration of embodiments of the subject invention, which is described in more detail below, provides enhanced transmission efficiency for low data volume communications in a satellite communication system. This scheduled transmissions approach can be particularly useful in applications with regular reporting by satellite terminals established on a long-term basis, such as utility metering in which the satellite terminals monitor and report consumer utility usage.

In some embodiments of the invention, satellite terminal identities are not transmitted but are derived at the receiver based on the time of the burst arrival. The payload portions of bursts can be used to derive time-framing, reducing overhead such as specific synchronization channels. It is also possible to avoid the exchange of capability information by mapping capabilities to the satellite terminal identity. Various embodiments can include efficient rescheduling of groups of timed transmissions to react to busy hour changes. The rescheduling of transmissions can be done based on pre-arranged alternative schedules which can be controlled via the broadcast system information. Also, power control suited to a low duty cycle and low overhead operation can be used. If GPS signals are being tracked, framing can be synchronized to GPS time enabling quicker synchronization. Enhanced margin operating options can also be included. For example, high priority communications, such as emergency calls, can be configured for transmit-only terminals which are not configured to receive satellite signals. Alternatively, paging to request a special format burst transmission can be configured where the special format trades the quantity of information within the burst for higher probability of detection. Higher forward link power may also be provided in pre-defined patterns with a low duty cycle thus enabling link-constrained terminals to receive forward link bearers at a low rate. Various additional features of embodiments of the invention can include acknowledgements with low average power based on zero power ACKs as described in more detail with reference to FIG. 9 and/or terrestrial expansion of service as described in more detail below. Terrestrial expansion can include enabling satellite terminals to receive transmission from satellites but to transmit to local receivers on the ground enabling higher throughput for scheduled reporting, etc. Alternatively, or in addition, hub equipment can be configured to perform both transmission and reception. Frequency shifting relays can also be used. These relays can be primarily aimed at reaching heavily shadowed terminals such as terminals with an obstructed view of the satellite.

One exemplary implementation of an embodiment of a burst message which uses a robust format is described herein (in terms of the number of information bits, etc.) using a particular network configuration. This description of such an exemplary implementation addresses the modulation of payload information. Other elements of transmitted waveforms can include: pilot, acknowledgement, and power setting communications. For the purposes of this explanation, bursts can be described as transmitted waveforms communicating information.

In one embodiment, a burst can be formed as follows:
Input contains 112 payload information bits;
An appended 16-bit Cyclic Redundancy Code (CRC) yielding 128 uncoded bits;
Error correction coding, at rate ¼, yielding 512 coded bits;
Each coded bit can be spread using a 256 bit Walsh code, yielding a total burst length of $2^{17}$ bits;
A 1024 bit Gold code can be combined (in this case via an XOR function) with groups of 4 coded bits (each spread by a 256 Walsh code), wherein each such group has the duration of a timeslot. Each quarter of a timeslot, associated with a Walsh code, is called a symbol. That is, each coded bit corresponds to a symoble. There can be 128 timeslots and 512 symbols in each burst;
Each of the $2^{17}$ bits in a burst can be transmitted as a chip (i.e. a filtered waveform) with time spacing (from chip-to-chip), of a chip period; and
The time taken to transmit $2^{17}$ chips is a frame.

The timing of bursts transmitted by terminals can be defined in terms of return transmit slots, which are times within frames that are identified by return transmit slot indices. The times are selected to provide good performance in reception of the bursts. More specifically, the defined times reduce the probability of simultaneous reception of bursts from different terminals that are aligned in timeslots.

In one embodiment, an exemplary network configuration can include the following parameters:
Forward Link Carrier Frequencies and numbering (Absolute Radio Frequency Channel Number or "ARFCN");
Chip Rate;
Filter characteristics, e.g. Roll-Off factor of Square-Root Raised Cosine; and
Frame Reference to enable time definition.

Sample parameter values in one exemplary embodiment can be set as follows:
Forward carrier frequencies at 1,525,000,000+31,250*N; where $1 \leq N \leq 1,087$
Chip Rate=23,400 cps
Roll-Off Factor=0.35
Frame Reference based on GPS time, starting at a particular date and time, e.g.
UTC (midnight) of Jan. 1 to 2, 2017.

The 512 coded bits transmitted can each be associated with a 256-bit Walsh coded sequence. Each Walsh coded sequence can be selected from one of 256 possibilities, each defined by a Walsh Code Index. Selection of the Walsh codes can give a degree of freedom in the design of a system. For example, the set of Walsh codes used for transmission of BCCH channels can be a key to Forward Link synchronization. As mentioned above, conventional satellite communications systems typically do not have air interface capabilities of the type described herein with respect to various embodiments of the invention, which are capable of communicating a complete message without establishing a connection involving several or many burst transmissions.

Scheduled transmissions can be a key capability in various embodiments of the invention. The following description outlines various embodiments of scheduled transmission establishment and execution.

During terminal registration, the central server could establish scheduled transmissions to be performed by that terminal. The following set of parameters provides an example of the information that may passed to the terminal. In one embodiment, 54 bits of transmitted information consist of 3 parameters and the combination of these parameters can be called an Information Element. For example, Information Element TI_IE_Sched_TX_Config can comprise parameters TI_ELMT_Sched_TX_First_Frame, TI_ELMT_Sched_TX_Frame_Incr, and TI_ELMT_Sched_TX_Timeslot. TI_ELMT_Sched_TX_First_Frame can comprise 23 bits, TI_ELMT_Sched_TX_Frame_Incr can comprise 23 bits, and TI_ELMT_Sched_TX_Timeslot can comprise 8 bits. The first element, TI_ELMT_Sched_TX_First_Frame, can define the 23. Least Significant Bits (LSBs) of the frame number of the first transmission (e.g., it can have a range of ~543 days if the chip rate is 23.4 kcps). The second element, TI_ELMT_Sched_TX_Frame_Incr, can define the number of frames between transmissions (which can also have a range of ~543 days if the chip rate is 23.4 kcps). The third element, TI_ELMT_Sched_TX_Timeslot, can define on which of the timeslots within the selected frame the terminal should begin transmission.

Figure 12:
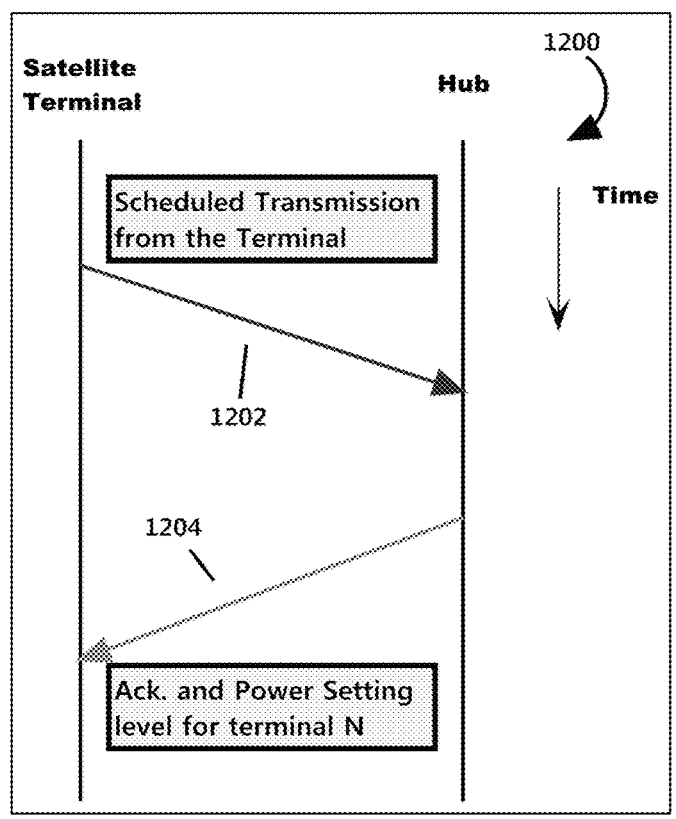
FIG. 12 is a schematic diagram showing the protocol associated with a successful scheduled transmission according to one embodiment of the subject invention.

The assignments of frames and timeslots can be arranged to ensure that each terminal has a unique transmission start time. For example, when the time of the first scheduled transmission is approaching (perhaps 100 seconds beforehand), the terminal can acquire and then receive the forward link control channel, the BCCH. The terminal can then read some of the content of the System Information to determine whether it should proceed with the scheduled transmission. That is, the terminal can check that channel quietening is not active and that transmission is enabled. The terminal may then execute a protocol that begins with transmission of the scheduled transmission burst 1202, as shown in FIG. 12. As the transmission time approaches (perhaps a few seconds beforehand), the terminal can prepare the burst for transmission and the associated real-time control registers can be programmed to enable the transmission to begin. Then, at the selected transmission time, the burst can be transmitted. As shown in FIG. 12, the terminal will then receive a burst 1204 from the hub. If that burst contains an ACK indication, then the protocol will end, and the terminal will return to a dormant state and wait for the next scheduled transmission. If a NACK indication is received, then the terminal will retransmit the burst at a pre-defined retransmission time. Retransmissions will continue until an allowed maximum number of retries is reached.

Figure 13:
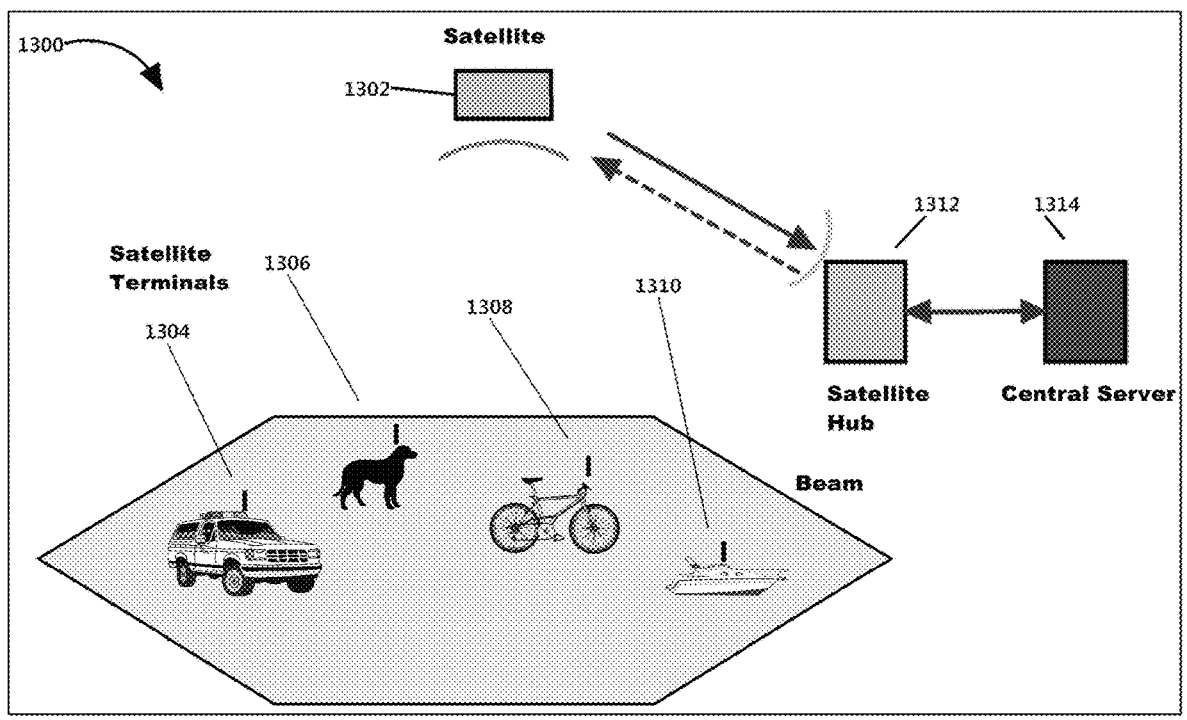
FIG. 13 is a schematic diagram showing several terminals in a beam where each terminal executes scheduled transmissions according to one embodiment of the subject invention.
Figure 15:
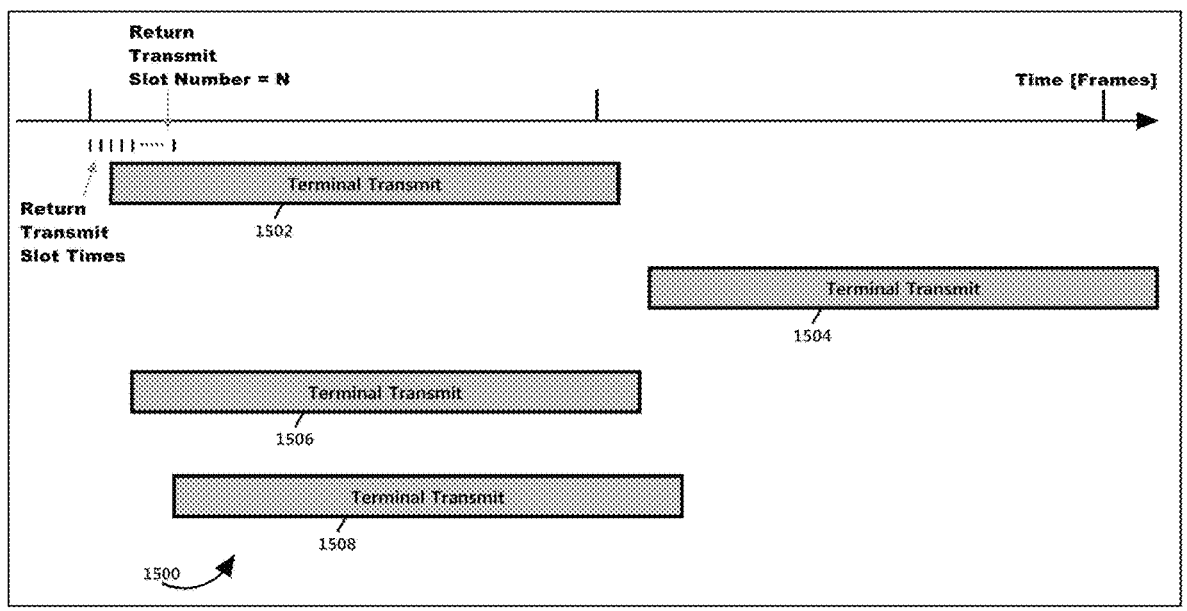
FIG. 15 is a schematic diagram showing the timing of bursts transmissions from multiple terminals with scheduled transmissions according to one embodiment of the subject invention.

FIG. 13 illustrates one embodiment of the subject invention in which multiple terminals, located in the same beam, execute scheduled transmissions. Terminals located in beams other than the one illustrated here may use different Gold sequences and thus are typically not seen by Hub 1312. The four terminals 1304, 1306, 1308, 1310 can be assigned different transmit times as illustrated in FIG. 15. The TI_I-E_Sched_TX_Config Information Element can be used to assign the different scheduled transmission times for bursts 1502, 1504, 1506, and 1508. As shown in FIG. 13, terminal 1304 can be a mobile terminal attached to a moving vehicle, terminal 1306 can be a mobile terminal attached to a house pet, terminal 1308 can be a mobile terminal attached to a bicycle, and terminal 1310 can be a mobile terminal attached to a boat. The terminals 1304, 1306, 1308, 1310 can be configured to send burst messages to the network infrastructure (satellite hub 1312 and central server 1314) through the satellite 1302 at different pre-determined times such that the network infrastructure can match up the burst messages with the sending terminal based on the time of reception of the burst message at the network infrastructure. In this way, message overhead can be reduced because terminal identity information as well as other overhead typically found in a conventional communication system, is not needed.

Figure 14:
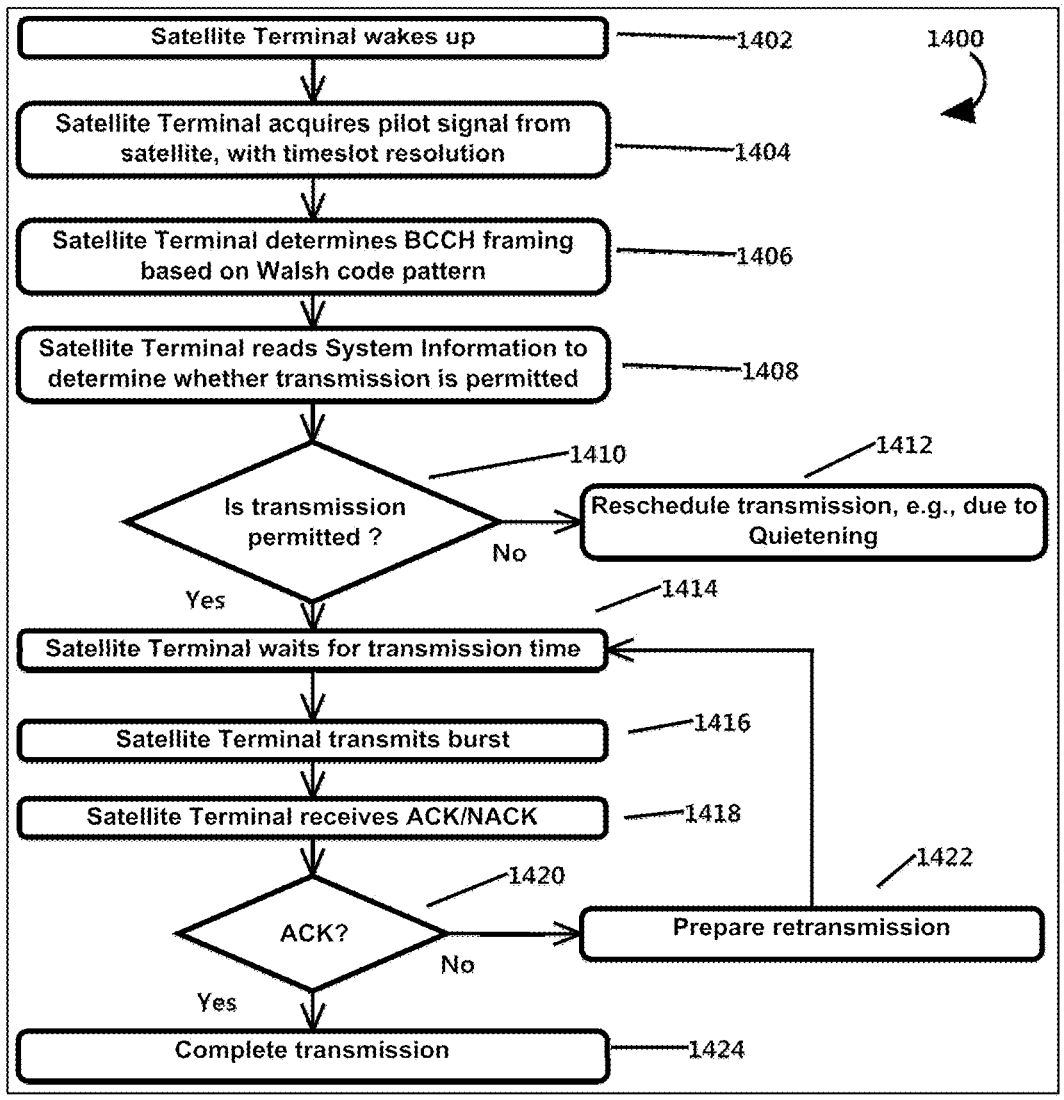
FIG. 14 is a flow chart illustrating an exemplary scheduled transmission as seen by a terminal.

FIG. 14 illustrates an exemplary scheduled transmission process for a terminal according to one embodiment of the invention. Each terminal in a system can implement scheduled transmissions as shown in FIG. 14. According to FIG. 14, the terminal first wakes up 1402, then acquires the pilot waveform 1404 resulting in resolution of timeslot boundaries. Burst framing can be determined by the terminal based on Walsh code sequences associated with the BCCH 1406. The terminal then reads the System Information 1408 and, based on the content of the System Information, the terminal can determine whether to proceed 1410 with the scheduled transmission, or to reschedule for a later time 1412. If it is determined that the transmission should proceed, the terminal will wait for the assigned time 1414 and then transmit the burst 1416 at the scheduled time. After transmission, the terminal will receive an acknowledgement (ACK or NACK) 1418. In the event an ACK is received, the scheduled transmission will be completed 1424 and the terminal will go back to sleep. If a NACK is received, the terminal will prepare to retransmit the burst 1422, and then repeat the transmission and acknowledgement steps 1414, 1416, 1418, 1420 until the burst is successfully transmitted.

The maximum number of retransmission attempts can be limited by a parameter that can be delivered via System Information. The hub receiver can be configured to receive transmitted bursts from each of the four terminals. The spreading codes (Gold and Walsh) can be used to enable the separate reception of each burst. These bursts may overlap in time. Low auto-correlation of the spreading sequences can enable reception of burst which overlap in time. The time at which the bursts are received depends on the transmission time and the length of the signal paths. The maximum difference in signal delay across a beam is usually less than the difference between the assigned transmission times. Signal delay can arise both in the forward link, from which the terminal derives its time reference, and the return link, through which the transmission passes. As a result, the arrival time of each burst can be unambiguously mapped to the source terminal.

Figure 4:
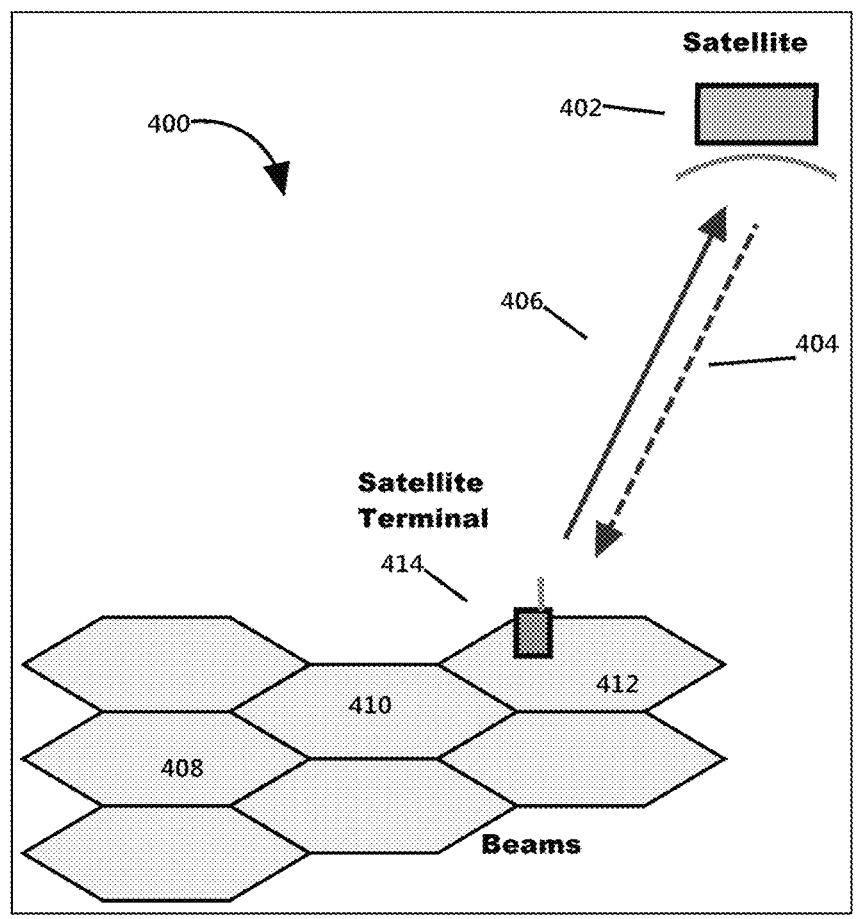
FIG. 4 is a schematic diagram of a satellite communication system according to the present invention showing satellite beams formed on the Earth's surface.

As shown in FIG. 4, in an exemplary satellite communication system 400, a satellite 402 may provide communication links to areas on the Earth's surface. Using a beam former, the satellite 402 can direct signals 404 to areas on the ground, for example, creating beams 408, 410, 412. Typical satellites create hundreds of beams, where each beam is hundreds of kilometers in diameter. Within a beam, multiple carrier frequencies may provide connectivity (in each direction 404, 406). Neighboring beams (such as 408 and 410) can use the same carrier frequency. A satellite terminal 414 within a beam 412 can be assigned resources associated with that beam 412. Multiple satellites may create beams that cover a satellite terminal, which means that operational mapping between each satellite terminal and a satellite (and beam) should be determined.

Figure 5:
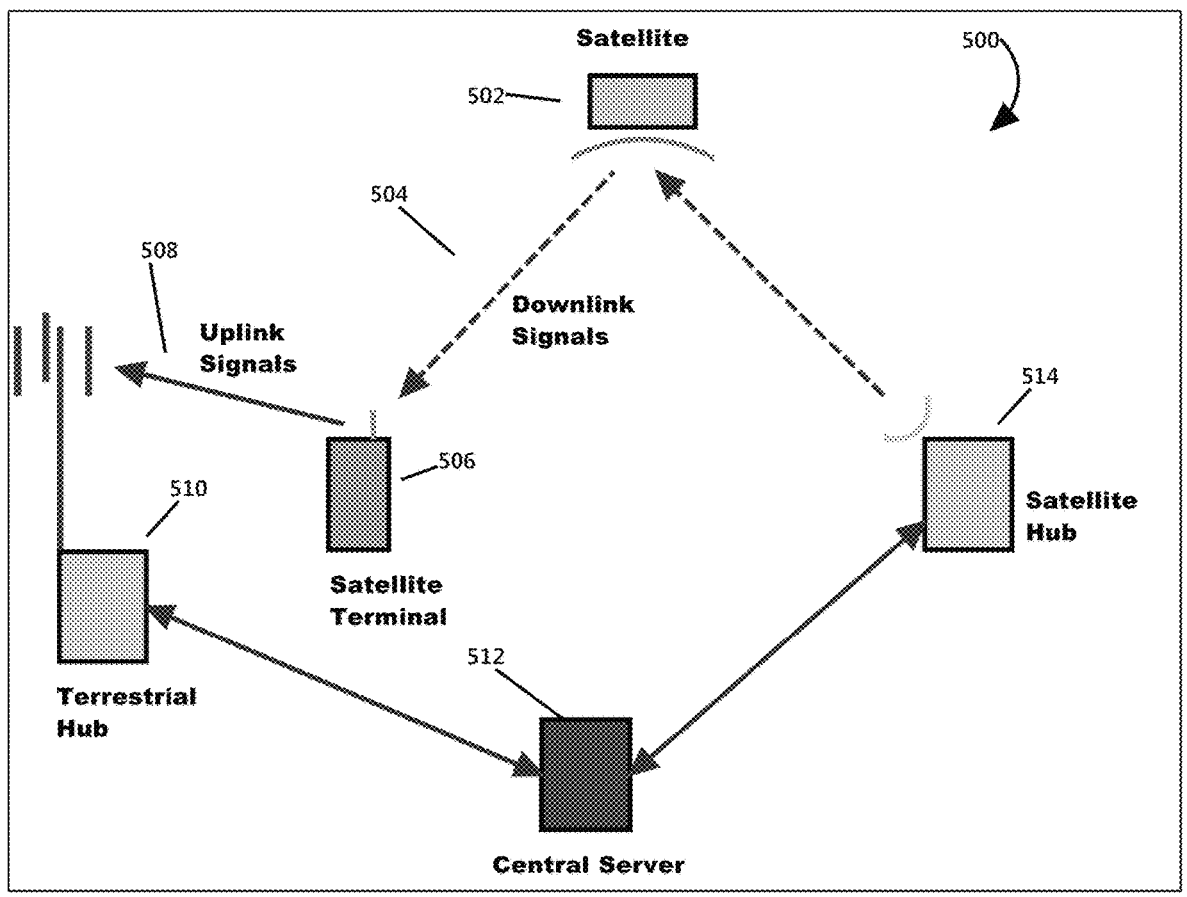
FIG. 5 is schematic diagram of another embodiment of a satellite communication system according to the present invention showing a terrestrial hub in the satellite communication system.

In some instances, particularly when the number of satellite terminals within a beam is large, it may be advantageous to provide a terrestrial receiver for the satellite terminal transmissions. FIG. 5 illustrates an embodiment of a satellite communication system 500 in which a satellite terminal 506 receives downlink signals 504 from a satellite 502 but transmits 508 to a terrestrial hub 510. This architecture can be particularly advantageous to applications, such as utility metering, in which most of the communications traffic is in the direction from satellite terminals 506 to a central server 512. In this embodiment, information from satellite terminals, such as 506, within wireless communications range of the terrestrial hub 510 could be received by the terrestrial hub 510. Terrestrial reception could use the same terminal transmit channel as that used for the satellite link. The terrestrial hub 510 could be configured to be aware of the delay to the satellite 502, and thus could determine the expected time and frequency of received bursts. As such, the satellite terminal 506 need not be aware of terrestrial reception.

The terrestrial hub 510 can be configured to change the satellite terminal 506 transmit power to match the needs of terrestrial reception. In many cases, this can result in significant power reduction. The power change can be implemented in a number of different ways. For example, the power change can be a gradual adjustment after each transmission or the power can be adjusted via a paged exchange where the terrestrial hub 510 individually instructs (via the central server 512, the satellite hub 514, and the satellite 502) each satellite terminal 506 to make a change in power. The range of power control of the satellite terminal 506 to support satellite operation can be typically approximately 15 dB. For terrestrial operation, the required range can increase to approximately 80 dB due to the variation in path loss in a terrestrial environment. The dynamic range can be reduced in a number of ways such as using higher data rates when transmitting close to the terrestrial hub 510 or using multi-user detection at the terrestrial hub 510 to reduce the sensitivity to the difference in received power levels between terminals 506.

In another embodiment, communications in both directions may be provided terrestrially, such as when the volume of traffic in both the uplink and downlink directions becomes large. As shown in FIG. 6, the terrestrial hub 610 and satellite terminal 606 can be configured to communicate in both the uplink 608 and downlink 604 directions terrestrially. The terrestrial hub 610 and satellite terminal 606 can be configured to use additional channels. As conventional satellite systems may use Time Division Multiple Access (TDMA) within each beam (and frequency reuse over several beams), the number of channels available for terrestrial Code Division Multiple Access operation with a beam could be a sizable portion of the satellite system's 600 available spectrum.

Figure 7:
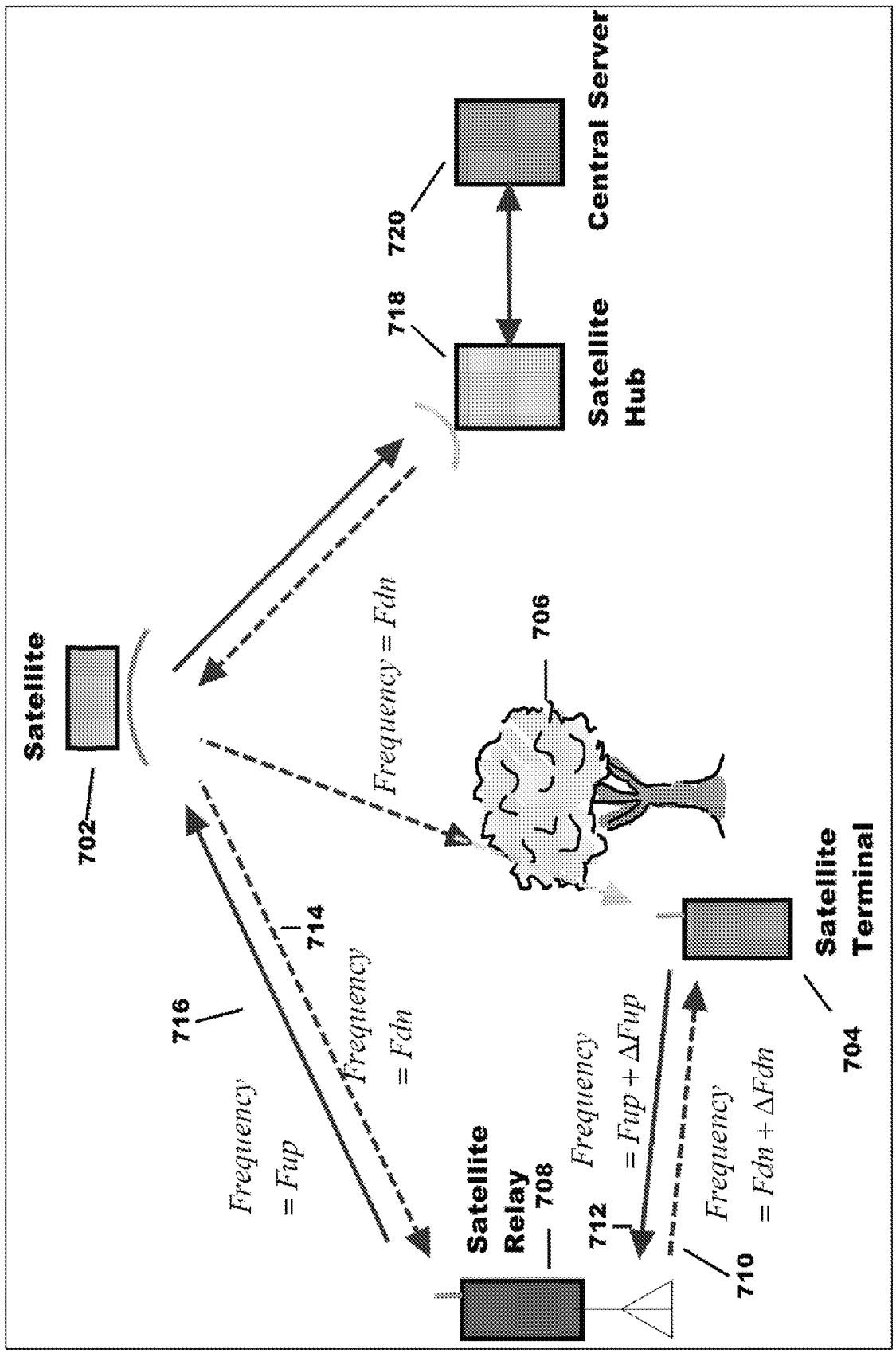
FIG. 7 is a schematic diagram of another embodiment of a satellite communication system according to the present invention showing a satellite relay in the satellite communication system.

In general, a satellite must have line-of-sight access to a satellite terminal in order to communicate with the satellite terminal. As shown in FIG. 7, a satellite terminal 704 may be shadowed from a satellite 702 if the line of sight between them is obscured, such as by a tree 706 or other obstruction. Embodiments of the invention can include terrestrial relays 708 which are ground-based transceivers that provide links 710, 712 to a shadowed satellite terminal 704.

A terrestrial relay 708 can be configured to receive forward link 714 communications in one or more channels from a satellite 702. The terrestrial relay 708 can then retransmit the content to the shadowed satellite terminal 704. Retransmission can occur at another frequency within the allocated forward link band, but typically not used directly from the satellite 702 within the beam containing the terrestrial relay 708. For example, the terrestrial relay 708 may receive forward link 714 communications from the satellite 702 at a carrier frequency of Fdn and then retransmit 710 the information to the shadowed satellite terminal 704 at a carrier frequency of Fdn+ΔFdn.

Similarly, the terrestrial relay 708 can also be configured to transmit return link communications 716 to the satellite 702. The terrestrial relay 708 can receive return link signals 712 from the shadowed satellite terminal 704, frequency shift the received signals, and retransmit the frequency shifted 716 to the satellite 702. For example, the return link carrier frequency may be transmitted at a carrier frequency of Fup+ΔFup from the shadowed satellite terminal 704 and the terrestrial relay 708 may convert the carrier signal to Fup for retransmission to the satellite 702.

The frequency offsets (ΔFdn, ΔFup) applied to both the forward link 714 and return link 716 can be advertised in the broadcast system information. In addition, the signals passing through the terrestrial relay 708 in both the forward link 714 and return link 716 can also have a fixed delay. For example, the delay may be set at 0.1 ms (with a tolerance of 5 μs). The shadowed satellite terminal 704 can be aware of the delay in the terrestrial relay 708 (as this is either a system constant, or a period defined in the broadcast system information) and can also be aware that they are using a terrestrial relay 708 (as the frequency of the forward link 710 coincides with a relay assignment). The shadowed satellite terminal 704 can adjust its transmit timing such that its transmissions arrive at the satellite 702 at an intended time (i.e., the central server 720 and satellite hub 718 need not be aware that the shadowed satellite terminal 704 is operating via a terrestrial relay 708). Alternatively, status messages from the shadowed satellite terminal 704 may inform the central server 720 whether or not it is operating via a terrestrial relay 708.

The terrestrial relay 708 does not need to modify the content of data passing through it. The terrestrial relay's 708 primary function can be carrier frequency conversion. In addition, the shadowed satellite terminal 704 may be configured with sufficient margin in its scheduling of events to reduce the delay between reception and transmission of signals. For example, with a fixed delay of 01. ms in each direction in the terrestrial relay 708, the change in delay at the shadowed satellite terminal 704 could be 0.2 ms.

Figure 8:
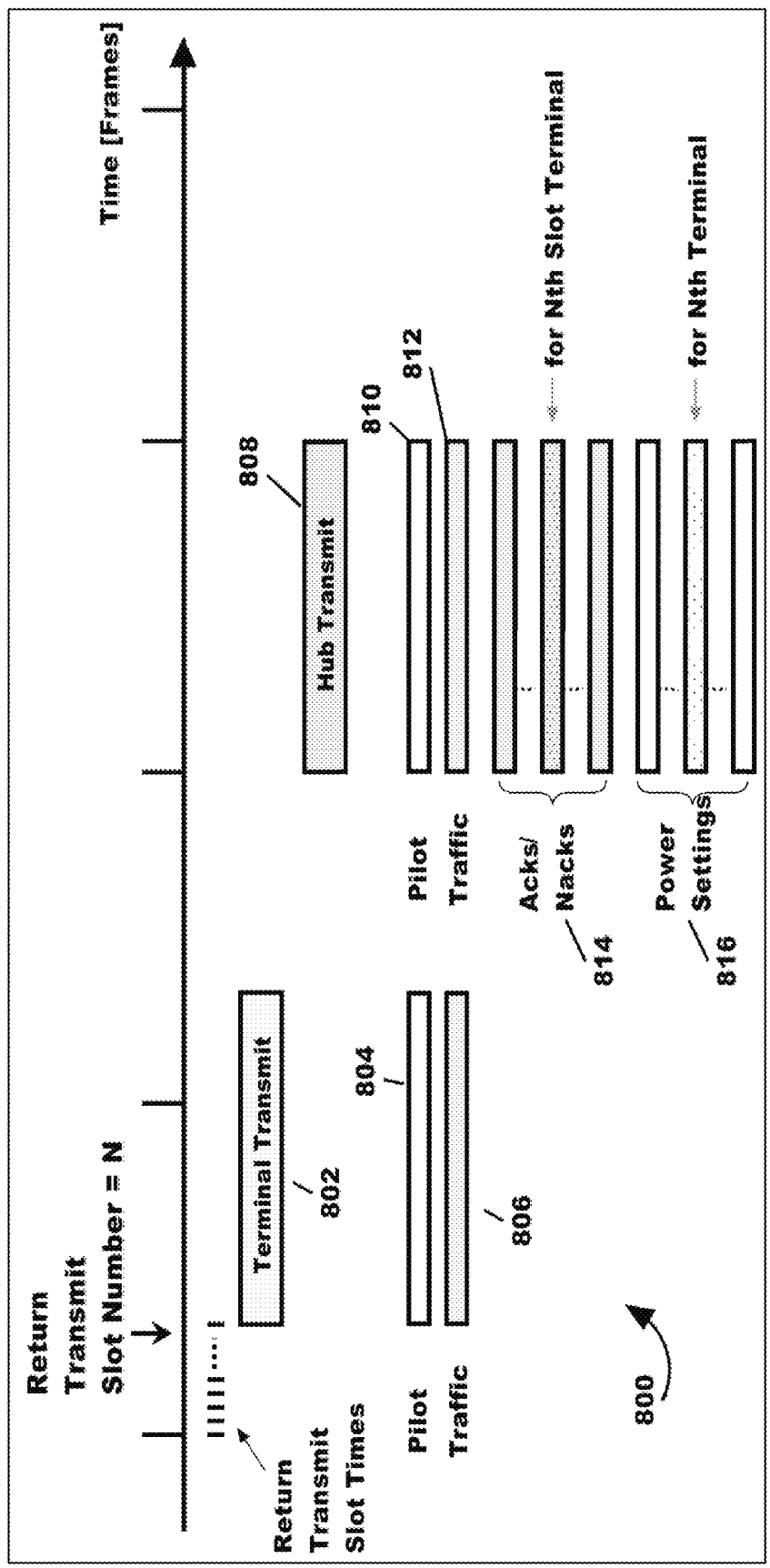
FIG. 8 is a schematic diagram showing signaling elements contained in a burst involved in a scheduled transmission according to one embodiment of the subject invention.

As described above, in various embodiments of the subject application, satellite terminals can communicate with network infrastructure using scheduled burst transmissions that are intended to communicate a complete message without all the overhead used in establishing and terminating a connection associated with conventional satellite communication systems. FIG. 8 illustrates one exemplary scheduled transmission communication 800. During scheduled transmissions, a satellite terminal transmits a burst 802, where the content of the burst comprises a pilot 804 and traffic 806. The central server can respond with a hub transmission 808, which can contain responses to all the satellite terminals that have transmitted over the period of a frame. The hub transmission 808 can include pilot and traffic signals 810, 812, as well as acknowledgements 814 and power settings 816.

In various embodiments of the invention, the acknowledgement information can be modulated. During each frame, the number of satellite terminal scheduled transmissions will be less than 256 (i.e., corresponding to the number of orthogonal Walsh codes). As such, in the corresponding forward link frame, fewer than 256 acknowledgements (and 256 power control signals levels) can be transmitted. A single (normal) Walsh code can be assigned for acknowledgements and another single Walsh code can be assigned for power control levels. Note that there are 512 coded bits where each of those is modulated by a normal Walsh code within each burst. There can be two distinct categories of Walsh code based spreading sequences: Normal Walsh codes (i.e., of length 256 for the most robust case) used to modulate each coded bit; and Long Walsh Codes, used to generate orthogonal sequences over the whole burst (i.e., of length 512) where each bit applies to a symbol. To transmit a binary value over the duration of a burst (e.g., ACK/NACK) a specific Long Walsh Code can be assigned to each satellite terminal. The mapping from Long Walsh Codes to satellite terminals can be based on the return transmit slot index. The 512 possible Long Walsh Codes are more than sufficient to support the number of satellite terminals which is less than 256 in number.

As the target Frame Error Rate (FER) falls below 1%, the expected ratio of ACKs to NACKs is at least 99:1. To conserve satellite power, it would be beneficial to minimize the total energy needed to transmit the combination of ACKs and NACKs. Received signals can be passed through a matched filter, synchronized in time and frequency, and correlated with the known spreading sequences. The result can be viewed as a baseband equivalent 2-dimensional vector called a correlation vector.

Figure 9:
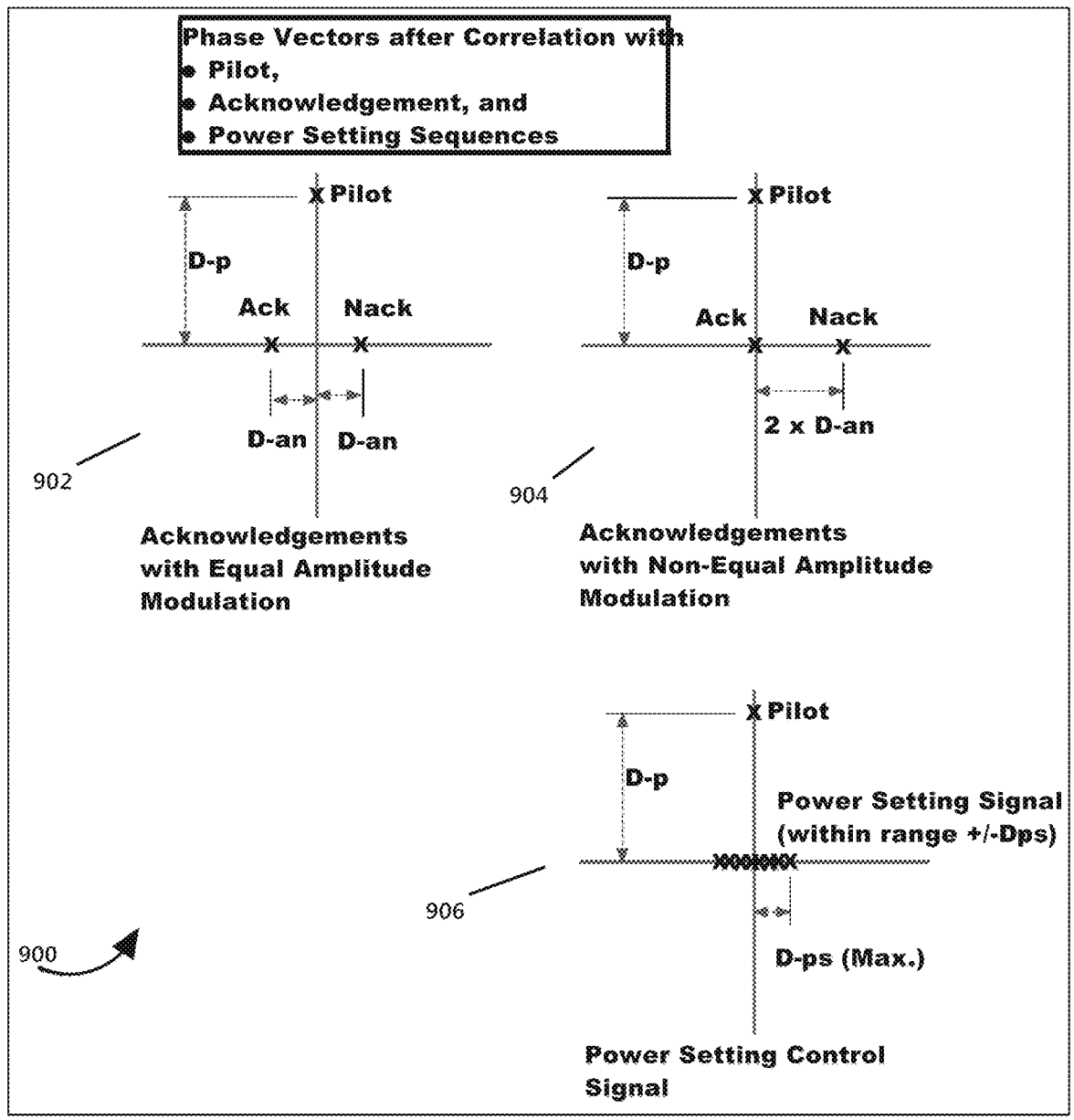
FIG. 9 is a schematic diagram showing modulation and acknowledgement and power setting information for scheduled transmissions according to one embodiment of the subject invention.

FIG. 9 illustrates exemplary acknowledgement 902, 904 and power setting 906 correlation vectors without noise or other impairments. To achieve a desired error rate in the acknowledgements, the distance in correlated vector space between the constellation point associated with an ACK and that associated with a NACK should exceed a minimum length. In one embodiment 902, which shows an example with equal amplitudes for ACK and NACK modulation, this distance can be 2×D-an. One of the key drivers of the error rate can be the distance between the points, not their locations. The location of these constellation points in correlation space is a degree of freedom, allowing the vectors to be moved such that the total associated energy can be minimized. For example, the associated power may be 99×P-ack+1×P-nack, where P-ack and P-nack are proportional to the square of the amplitude of each vector. As there are many more ACKs than NACKs, average power can be reduced by reducing P-ack and increasing P-nack. Average power is minimized when P-ack is close to zero. In the case illustrated (with P-ack set to zero) by 904, the NACK-related correlation vector has twice the amplitude D-an; meaning that P-nack is 4 times what it would be if P-ack=P-nack as shown by 902. The average power required to transmit acknowledgements for case 904 is about 4% of that required for case 902, which equates to a reduction in power of approximately 96%. To achieve this performance, the decision threshold between the ACK and NACK related constellation points should be known. As the acknowledgements are transmitted in the presence of pilot signals, the receiver can be configured to calibrate the location of the decision threshold.

The error rate for the acknowledgement process is typically significantly better than for data traffic. For example, the acknowledgement process error rate can be lower than 0.1%. At the same time, the error rate for NACKs can be traded against that for acknowledgements ACKs. This trade can be driven by the relative costs of a mistake. For example, a NACK received as an ACK can result in failure to communicate the message, while an ACK received as a NACK can result in an unnecessary retransmission (which would typically have less impact). According to various embodiments of the invention, the acknowledgement process can be implemented using existing physical bearers, without specific changes to the physical layer design to improve efficiency.

Initialization of communication between satellite terminals and the central server can be accomplished in a number of different ways. For example, scheduled satellite terminal transmissions can be used where a predefined time is established at which the satellite terminal would transmit a fixed length message. A typical embodiment of this type can be used in many different applications, such as, for example, regular utility meter readings. Another exemplary embodiment can use alarm-driven satellite terminal communications. In these embodiments, some event at the satellite terminal can initiate an exchange of information. For example, opening a door can trigger an alarm that would begin an information exchange. In still another embodiment, paged communications can be used in which the central server initiates an exchange of information. One sample application of this type of embodiment could be used to change parameter settings in the satellite terminal.

Each satellite terminal can have a unique associated identity, denoted by a Mobile Device Identity (MDI), which can be a 64-bit value. During operation, a satellite terminal can also be assigned a Temporary MDI (TMDI), which can be shorter, such as a 24-bit value. During alarm-driven communications the related satellite terminal will identify itself, and for paged communications the satellite terminal can be identified by the central server. This identification can be provided by the TMDI. During scheduled transmissions, the satellite terminal can be aware of the transmission time and the central server can be aware of the identity of the satellite terminal that is configured to transmit at the scheduled time. The central server can identify the satellite terminal without having to read information from the content of the transmission. In other words, identity information need not be included in the transmitted information. For example, in a burst containing 112 payload bits, the application-related information can be increased by 27% by avoiding the transmission of 24-bit identity information. In addition, each satellite terminal can be configured to apply unique ciphering to its transmitted data, providing another means of confirming the identity of a source satellite terminal.

When a satellite terminal powers up, it can acquire and synchronize to the forward link channels of a satellite. This can be accomplished in a number of ways. For example, with typical acquisition algorithms, the satellite terminal can detect the presence of a pilot channel, which can be used to determine estimates of the carrier frequency and timeslot timing. The start time of each timeslot can be resolved, but the location within each frame and the frame number are typically not determined by the acquisition algorithm. The BCCH can then be observed so that the frame boundaries can be determined.

Figure 10:
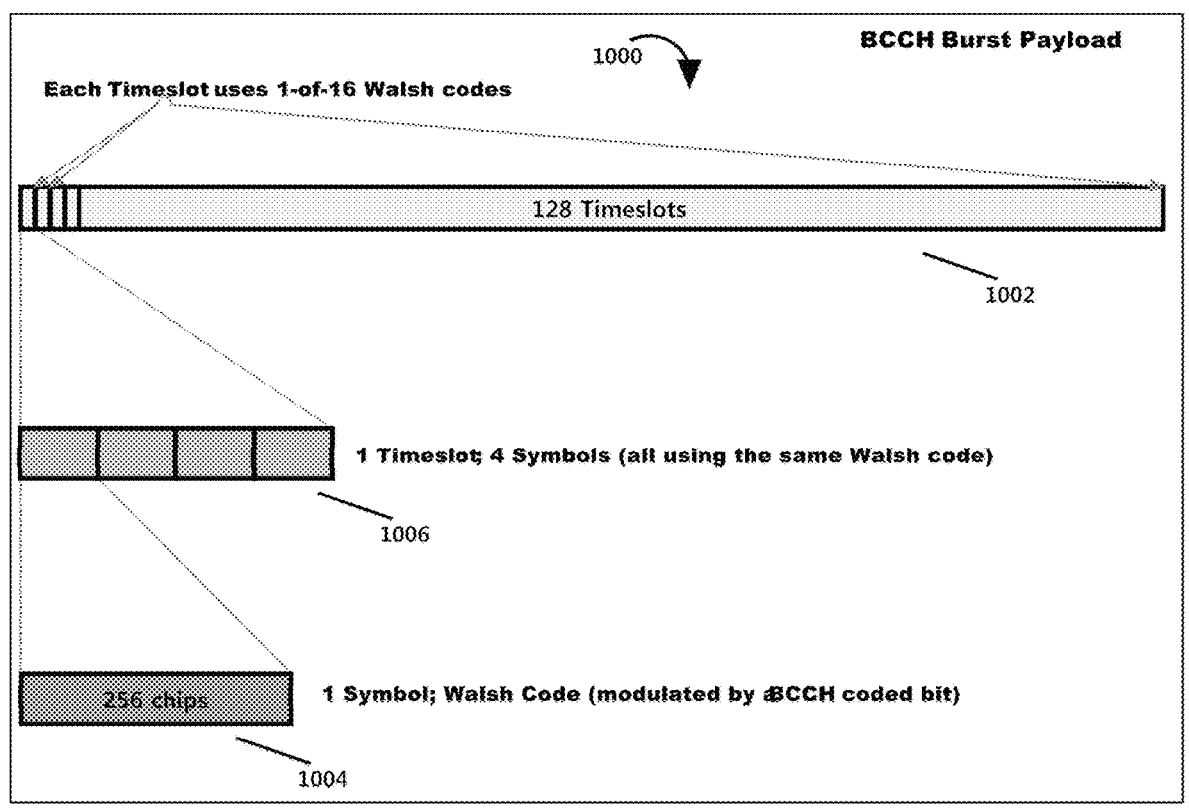
FIG. 10 is a schematic diagram showing the payload content of a BCCH burst according to one embodiment of the subject application.

FIG. 10 illustrates one exemplary BCCH payload structure 1000 according to various embodiments of the invention. The BCCH can use multiple known Walsh codes, transmitted in a known sequence, while modulating the payload information. By searching for correlation with the expected pattern of Walsh codes, framing of the forward link can be resolved. As such, a separate synchronization channel is not needed thus saving satellite power. As shown in FIG. 10, each BCCH burst payload can consist of 128 timeslots 1002, each of which can contain four Walsh codes 1004 associated with four coded BCCH bits 1006. The boundaries of the timeslots can be resolved as described above. The same Walsh code can be used for the 4 symbols of each timeslot. Over the 128 timeslots, 16 different Walsh codes can be used. The Walsh codes can be arranged in a pseudorandom pattern that can be selected with the goal of maximizing the distance between the correct framing and any offset of that framing by an integer number of timeslots. After establishing framing, the content of the BCCH can be received and the frame numbering can be read from system information.

Different satellite terminals can have different capabilities in part because applications associated with each satellite terminal may have different requirements. For example, a mobile terminal, such as one used for tracking a vehicle may have different capabilities and requirements than a stationary terminal, such as one used for utility metering. The parameters of protocols and other terminal characteristics established by the central server can depend on awareness of these capabilities. Additional differences may arise as the system evolves and terminals with newer capabilities are introduced. However, because the capabilities associated with satellite terminals in embodiments of the invention can be mapped to their identities (MDIs), there is no need to exchange information related to terminal capabilities. When transmitting information, the formatting of data may depend on the associated application, such as information related to electric meter reading or vehicular asset tracking. However, in embodiments of the invention, there is no payload overhead for defining field sizes, locations, etc. because the formatting of scheduled transmissions (and others) can also be mapped to terminal MDIs.

According to various embodiments of the invention, satellite terminals can be configured to support applications that transmit data at pre-defined times based on regularlyspaced intervals, but where the precise time of the transmission is not critical such as utility meter readings. Other services, such as voice links, provided by a satellite can involve concentrations of throughput at specific times of day, such as during times of heavy voice traffic. Typically, satellite terminal transmissions will be scheduled to avoid predicted busy hours. However, in some cases, satellite capacity may approach its limits due to unforeseen events. Under such conditions, scheduled transmissions can be reassigned based on parameters delivered via system information which can be read by the satellite terminals prior to transmission. This reassignment process, called scheduled transmission quietening, enables delaying of selected scheduled transmissions for a period of time. When rescheduling, a defined timeframe can be cleared of scheduled transmissions and transmissions can be rescheduled over the following hours. After conditions change, the system can return to normal operation. Scheduled transmission quietening can be used to efficiently enable management of satellite resources without individually changing the transmission schedules of every impacted satellite terminal.

In order to implement scheduled transmission quietening in embodiments of the invention, three system information parameters can be used to define the real-time communication status. A scheduled transmission quietening active flag (SI_quiet_flag) indicates that scheduled transmissions should not be transmitted. This flag can be set to stay active for a specified amount of time such as 2 hours. Additional parameters are used to define the configuration of quietening. One parameter (SI_ELMT_quiet_period) can be used to define a period of time (the quietening delay) that is equal to or longer than the period of quietening, where the parameter's 4-bit value is in units of 512 frames. A second single bit parameter (SI_ELMT_quiet_spread) can be used to define whether the retransmissions are spread over 4 quietening delay periods or 8 quietening delay periods. The selection of which of the 4 (or 8) quietening delay periods to use for the retransmission can be based on the Least Significant Bits of the terminal temporary identity (TMDI), which is a number known to both the terminal and the infrastructure.

Figure 11:
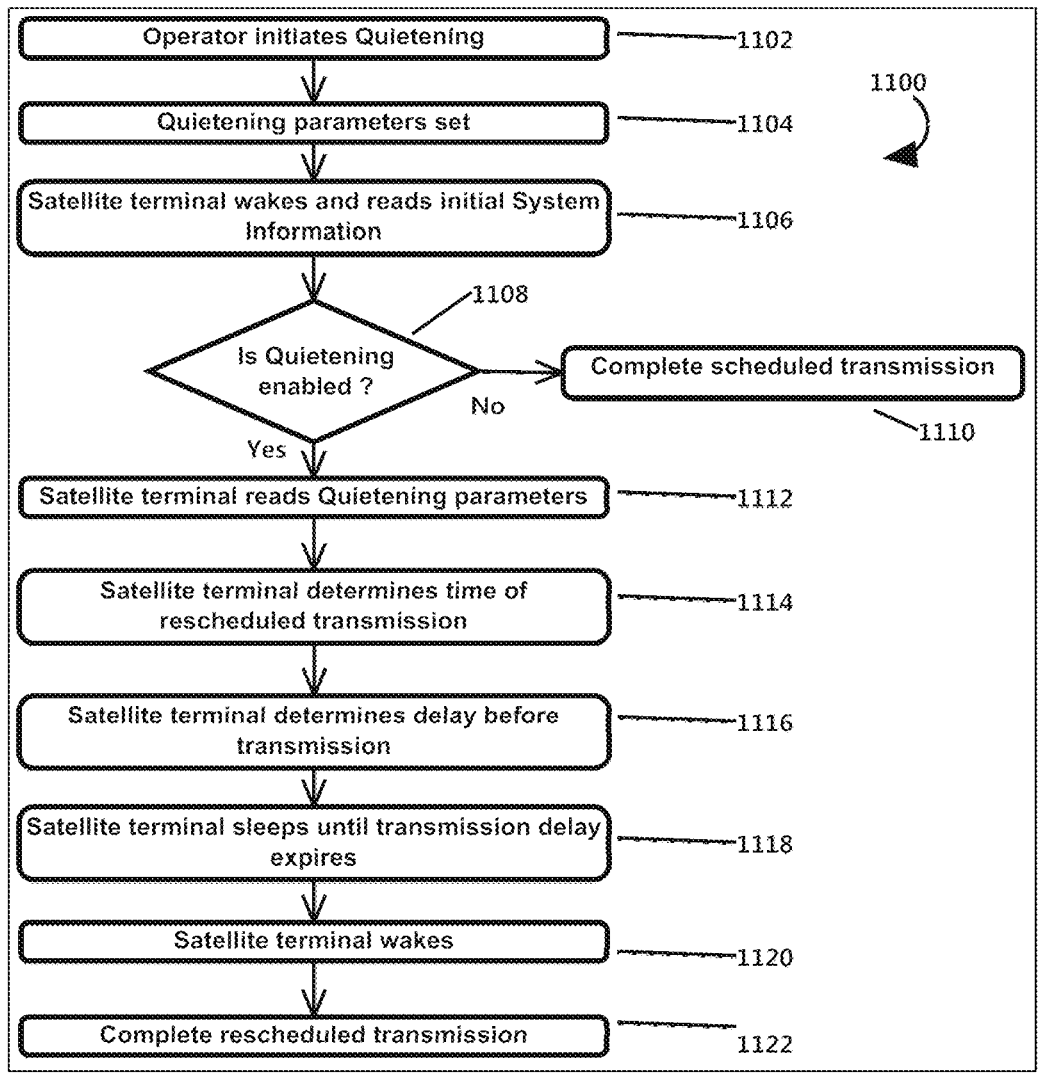
FIG. 11 is a flow chart illustrating an exemplary quietening process in terms of frame numbers according to one embodiment of the subject invention.

FIG. 11 illustrates an exemplary quietening process 1100. An operator may initiate a period of quietening that can be applied to scheduled transmissions at 1102. In doing so, the operator sets the quietening parameters which are entered into the System Information broadcast in the BCCH at 1104. For example, a period of 1.5 hours can be selected during which scheduled transmissions should be disabled (e.g., 9:00 PM-10:30 PM). In addition, the quietening delay can be set (via SI_ELMT_quietperiod), such as for 2 hours, and the number of delay steps after quietened transmissions can be set (via SI_ELMT_quiet_spread), such as for 4 times. Next a satellite terminal will wake up at 1106. The satellite terminal then determines whether or not quietening is currently enabled by reading the System Information entry, SI_quiet_flag, at 1108. If quietening is not enabled, the satellite terminal proceeds with its scheduled transmissions at 1110. If quietening is enabled and the satellite terminal has an assignment for a scheduled transmission during the quietening period, such as 10:05 PM, the satellite terminal can read the quietening parameters from the system information at 1112. The satellite terminal can then determine the rescheduled transmission time, at 1114, based on the quietening parameters. In order to do so, the satellite terminal can select a number between 1 and the number of delay steps after quietened transmission parameter, which, in this example, is 4. A deterministic reference known to the central server, such as Least Significant Bits of the TMDI, can be used to selecting the number. For example, in this case, the selected number may have a value of 3 (i.e., between 1 and 4). The transmission delay can then be calculated by multiplying the selected number (plus 1 to include the quietened period) by the quietening delay. In this case, since the quietening delay is 2 hours, the calculated delay is determined to be 8 hours or until 6:05 AM. After calculating the transmission delay, the satellite terminal goes back to sleep, at 1118, until the delay expires. At 1120, after the delay expires, the satellite terminal wakes up and, at 1122, the rescheduled transmission begins. It should be noted that the transmissions that have been delayed by the quietening process are transmitted with different CRC masks thus enabling the central server to distinguish rescheduled transmissions from regularly scheduled transmissions.

During scheduled transmissions, the central server can respond to each transmission with an acknowledgement and a power setting level. As there can be a correlation between the purposes of these values (i.e., low power is more likely to lead to failed communications and a NACK), the values can be interpreted as a pair when deriving power changes. For example, the following table provides an exemplary correlation between acknowledgement and power setting level.

| Case | Acknowledgement | Power Control Level | Action for Next Transmission (dB) | Nominal Power Change (dB) |
|---|---|---|---|---|
| 1 | ACK | −1 | Lower power by P-am | −0.5 |
| 2 | NACK | −1 | Raise power by P-nm | +1.0 |
| 3 | ACK | +1 | Raise power by P-ap | +1.5 |
| 4 | NACK | +1 | Raise pwer by P-np | +2.0 |

The actual power level changes can be controlled via system information or by terminal specific reconfiguration. A power control correction signal could be transmitted within a range relative to a pilot signal (e.g., if the pilot signal amplitude is +10 units, the power control correction signal amplitude can vary in one dimension of a base-band vector representation such as between −1 unit and +1 unit as shown by 906 in FIG. 9). The power control correction signal may be transmitted with a level anywhere in this range, indicating different requested changes to the satellite terminal's transmit power. The power changes in the above-table could be scaled by the level of the power control correction signal. That is, control scaling could be analog. This approach is possible due to the presence of the pilot signal, which enables calibration signal levels.

Error rates for acknowledgements should be lower than those for the message payload. For power control, on the other hand, high error rates are typically more tolerable, as (for example) any reception of a NACK can cause an increase in subsequent transmit power levels, irrespective of the received Power Control level. In exemplary implementations, the energy associated with transmitting a NACK might be 8 dB lower than traffic energy, while that for Power Control might be 23 dB lower than traffic energy.

In summary, the key features of a scheduled transmission (for the most common scenario in which no errors occur) are:
A message with no overhead (i.e., all payload bits are application-related) is transmitted,
No energy is used sending the ACK,
Power setting for future transmissions (if transmitted) is sent at a low power level.

Assuming 1% FER, and that Power Setting levels are transmitted, the average power transmitted in the forward link responding to each scheduled transmission could be ~1.1% of that of a forward link traffic burst.

The link margin of the forward link can be increased by raising the power transmitted at the satellite. At the same time, satellite power is a precious resource. By occasionally transmitting BCCH bursts at higher power levels, a trade between satellite power and/or link margin, and delay can be provided. As a satellite tends to be limited by the total instantaneous transmit power, it is typically advantageous to cycle the increase in power from beam to beam. For example, by arranging beams in groups of 16, the BCCH power could be increased in each beam for 1-out-of-16 BCCH bursts. By identifying the pattern of higher power BCCH bursts to the satellite terminals via system information, those terminals can target their reception to the higher power bursts for cases when they note that their receivers are operating at or below threshold signal-to-noise ratio. This same capability can be applied to lower average satellite power while still maintaining nominal link margin.

In some circumstances, a satellite terminal may not be able to detect the forward link signals, such as when the satellite is shadowed. If, at the same time, a terminal user requests an emergency alarm, the satellite terminal may be able to transmit a related emergency message. If GPS timing is available, the satellite terminal may use this as a basis for synchronizing its transmitter. If not, the terminal may transmit with synchronization based on its local reference oscillator. In this case, consideration shall be given to the potential frequency error, and how it might impact neighboring channels or how it might impact compliance with any regulatory requirements. Emergency transmissions may include information such as the identity of the satellite terminal and its location. These transmissions may be repeated at times defined for each terminal. The time between repetitions is known to the central server, which may attempt to combine multiple transmissions to reduce the error rate and thus identify the satellite terminal and its location.

In some circumstances, a satellite terminal's location may be of interest, under conditions in which the satellite terminal is unable to successfully transmit. For example, after a valuable item with an attached satellite terminal has been stolen, operators at the central server may invoke an emergency page. The hub can be aware of the paging reception time of a satellite terminal. Prior to reception, the satellite terminal can wake up and attempt to acquire the forward link channels. During the time the satellite terminal is attempting acquisition, the forward link signal levels may be raised to increase the link margin for both acquisition and the page. Once the satellite terminal receives the page, it can respond by transmitting a complete burst with known content at the maximum power level. This can be followed by a separate burst containing the terminal's location. The operators may also suspend other traffic in the return link during the time the satellite terminal is transmitting. This may increase the probability that the satellite terminal can be contacted and will respond.

Satellite terminals may switch between networks, which may be provided by different satellite operators, to provide, among other things, continuity of service in the event of a satellite failure. Support for this flexibility may arise in the satellite terminal implementation, such as, for example, carrier frequency flexibility, and in the system information, which may include definitions of existing networks as well as parameters enabling future networks to be defined. In situations in which a satellite terminal is covered by multiple networks, the central server may direct satellite terminals to a specific network. The system information may include information related to multiple network operation centers such as frequencies, chip rates, filter characteristics, etc. The satellite terminals may be configured with prioritized network preferences and/or the central server may be configured to redirect satellite terminals to different networks. As new networks come into existence, the system information may be updated to describe these new networks.

System Information (SI) can be a set of parameter values that are broadcast from a Hub to all terminals in a beam. In typical systems, SI can be arranged in a number of classes, enabling efficient management of transmission of the information. For example, information that changes rarely, such as descriptions of space relays, can be placed in a class with other rarely changing information. The priority, and likelihood that parameters will change, can drive the duty cycle at which each class of SI is transmitted. Particular SI parameters may be repeated in every BCCH burst, and some may not be repeated for many BCCH bursts. Some information may change at any time, and should be read before a terminal transmits, e.g., flags that can disable transmission. A terminal that is about to transmit should read these flags, but may not be required to learn of all the available space relays that are available. In another scenario, a newly registering terminal may go through the process of reading all the SI, including descriptions of space relays.

Figure 16:
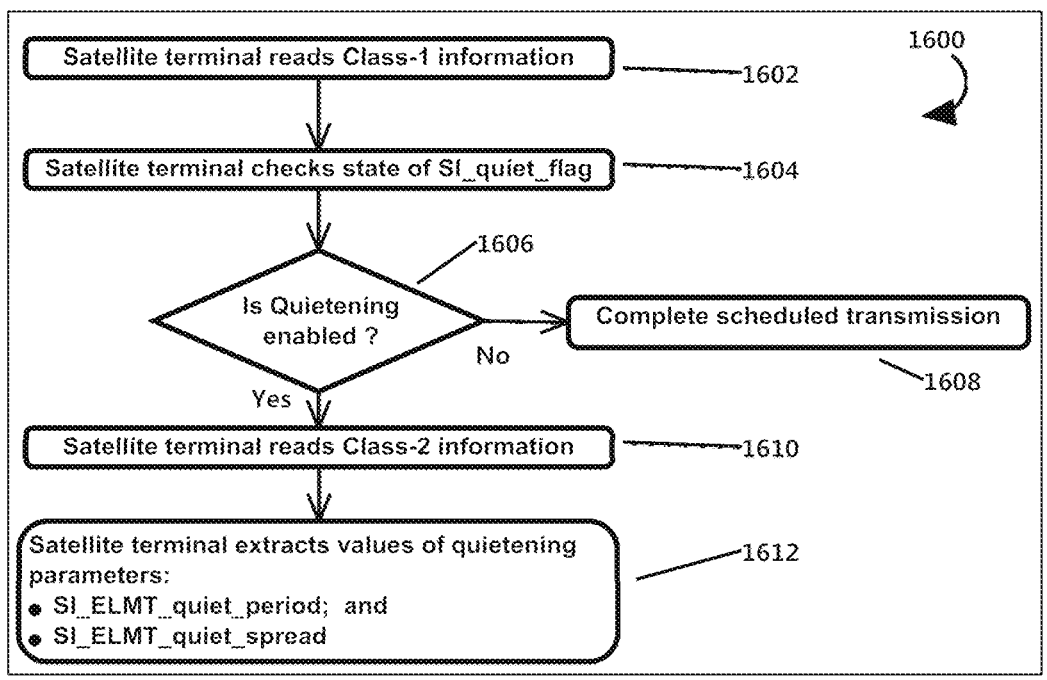
FIG. 16 is a flow chart illustrating a terminal reading system information according to one embodiment of the subject invention.

The System Information associated with scheduled transmission quietening can provide an exemplary case. In FIG. 11, a terminal reads quietening parameters from the System Information 1106 and 1112. FIG. 16 shows this process in more detail, where the quietening parameters are:

SI_quiet_flag; a 1-bit value in Class-1. System Information

SI_ELMT_quiet_period; a 4-bit value in Class-2 System Information

SI_ELMT_quiet_spread; a 1-bit value in Class-2 System Information

In preparation for a scheduled transmission, the terminal can read the Class-1 information 1602, which can be included in every BCCH burst. From the Class-1 information, the terminal can learn the value of the SI_quiet_flag (i.e., that quietening is requested). Given this information, the terminal cab be aware (a) that there will likely be a significant delay before the transmission occurs, and (b) that it should read Class-2 information to determine the parameter settings for the quietening. The terminal, therefore, can proceed with reception of the Class-2 information 1610 and with determination of the values of SI_ELMT_quiet_period and SI_ELMT_quiet_spread 1612. Note that the assignment of these parameters to Class-2 can be enabled by the available time for reading the content. In general, parameters can be assigned to the highest class number that enables the desired related operation.

Embodiments of the invention can also be configured with security features such as authentication of each satellite terminal by the central server during registration, authentication of the central server by the satellite terminals during registration, and/or ciphering of data transferred between the satellite terminals and the central server to name a few. In one embodiment, these security features can be implemented using a set of non-public keys that are stored at each satellite terminal and the central server. Compromise of the secret keys stored in a particular terminal would only impact that satellite terminal. In other words, the keys stored in a particular terminal do not provide information related to other satellite terminals. Means for identification of anomalous behavior by potentially-comprised terminals may be applied. For example, transmission from distant locations by multiple terminals with the same identity could be flagged as a potential security threat.

Unlike in conventional systems, the security related processing in embodiments of the invention occurs at the central server rather than at the hub. This approach provides enhanced security as secret keys need not be moved to hub facilities and the list of temporary and permanent secret keys for all satellite terminals can be maintained in one location. As embodiments of a system according to the present invention can be implicitly aware of the identity of every satellite terminal and all communications can pass through a single point and can be associated with specific owners, the motivation for compromising the system is inherently less than conventional systems.

Transmissions by satellite terminals can be prevented by the central server via the system information. In this way, it is possible to manage system resources, such as power and bandwidth, when a space relay approaches capacity. These controls typically apply at the time they are read by the satellite terminals. In other words, a satellite terminal must read the system information within a specified period prior to transmission. Individual transmissions may be prevented based on a variety of things such as terminal class and/or communication mode.

In various embodiments of the invention, the maximum length of a most robust burst can be 1,024*128 ($2^{17}$) chips, corresponding to approximately 5.6 seconds at 23.4 kcps, with an information data rate of approximately 20 bps. By using shorter Walsh codes (in factors of 2 steps), higher information data rates can be achieved. For example, rates of 40 bps, 80 bps, 160 bps, 320 bps, etc. can be achieved. The length of bursts can correspondingly be reduced with the information content of each burst remaining fixed. Bursts can be structured to support different data rates. For example, forward broadcast control channels can operate at the most robust data rate. For forward traffic channels and return link channels, bursts, configured during connection establishment can be configured for a factor of $2^N$ increase in data rate. For example, the number of timeslots in the burst can be reduced to $128/2^N$, the number of chips in the Walsh codes can be reduced to $256/2^N$, the length and content of Gold codes can remain unchanged at 1024 chips (a timeslot), and the number of coded bits per timeslot can increase to $4 \times 2^N$. Frame timing can be divided into subframes of length $2^{(17-N)}$. The hub can advertise the data rates of support for RACH, enabling the satellite terminals to select a supported rate. The AGCH can use the same rate as the RACH, but may assign another rate for subsequent communications.

In some situations, satellite terminals in an embodiment of the invention may be aware of Global Navigation Satellite Systems (GNSS). These systems may provide reference timing signals that could be applied as a reference for framing, etc. If satellite terminals are aware that framing is based on GPS timing, the satellite terminal may determine timeslot and burst frame timing, during acquisition, without having to derive it from the received signals. This can reduce the time needed for acquisition and thus reduce power. Terminals that are transmitting without receiving could also use the GNSS timing to transmit in specific timeframes that could be pre-arranged. Additionally, the terminals could use the frequency reference as a basis for reducing the frequency error in their transmission.

In some operating condition, channels may be shared with legacy services, such as those associated with other mobile satellite application like voice or packet data communication. This mode of operating is typically applied when the traffic volume is light (e.g. early in the deployment of a system or in beams that contain small terminal population). In one embodiment of the invention, the shared channel can be a control channel in the legacy system, in which the duty cycle of forward link transmissions is approximately 25%-50%. The legacy channels can operate with Signal-to-Noise Ratios that are 25-30 dB above that needed by embodiments of the subject invention. For example, legacy channels can require Ec/No=0 dB to 5 dB, where Ec/No is the ratio of energy in a transmitted chip (or symbol for systems without spreading) to the noise power spectral density. As such, the same forward link channel can be used to simultaneously transmit the legacy signaling and the spread signaling associated with embodiments of the subject invention. If needed, the power used for transmission of the legacy signals can be increased (typically by a small factor) to maintain the performance of the legacy system. Reception, in the forward link, of bursts associated with embodiments of the invention can be achieved if the level relative to the legacy transmissions provides sufficient Signal-to-Noise Ratio, (i.e. Ec/(Io+No) where Io is the interference power spectral density associated with the legacy waveforms. In the return link, the legacy system can use RACH transmission with low duty cycles. The transmissions associated with embodiments of the invention can also be transmitted with low duty cycle. Transmission associated with embodiments of the invention will typically have lower power than the legacy RACH transmission, so they can have a low impact on the RACH error rate. As the legacy RACH transmission have low duty cycle, relatively short burst lengths, and power levels that don't necessarily prevent reception, transmission associated with embodiment of the invention can have reliable performance. As the performance of the links can be different during periods when the channel is shared with legacy services, operation may be improved if the terminals are aware they are transmitting on shared channels. The broadcast system information can be used to inform the terminals that they are operating on shared channels.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

As used herein, the term module can describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto.

Furthermore, embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

What is claimed is:

1. A communication system, comprising:
   a terminal;
   a central server configured for two-way communication with the terminal through either a satellite or a terrestrial hub;
   the satellite being configured to facilitate two-way, extraterrestrial communication between the central server and the terminal using a common air interface; and
   the terrestrial hub being configured to facilitate two-way direct terrestrial communication between the central server and the terminal using the same common air interface;
   wherein the two-way communication between the terminal and the central server is conducted either extraterrestrially through the satellite or terrestrially through the terrestrial hub without requiring the use of different common air interfaces for terrestrial and extraterrestrial communication.

2. The communication system of claim 1, wherein the common air interface comprises Code Division Multiple Access (CDMA).

3. The communication system of claim 1, wherein burst messages communicated extraterrestrially through the satellite are sent on a transmit frequency band and burst messages communicated terrestrially through the terrestrial hub are on the same transmit frequency band.

4. The communication system of claim 1, wherein the central server is configured to set a terrestrial transmit power of the terminal to match needs of terrestrial reception through the terrestrial hub and an extraterrestrial transmit power of the terminal to match needs of extraterrestrial reception through the satellite.

5. The communication system of claim 1, wherein the central server further comprises an information element which includes scheduled transmission information and wherein the terminal is configured to communicate with the central server by sending a burst message at a pre-scheduled time such that the central server can derive a terminal identity for the terminal by comparing the time of the burst message with the scheduled transmission information in the information element without having to include terminal identity information in the burst message.

6. The communication system of claim 1, wherein the terminal is not required to be aware of whether communications between the terminal and the central server are communicated terrestrially or extraterrestrially.

7. A communication system, comprising:
   a central server;
   a terminal configured to communicate with the central server;
   a satellite configured to provide an extraterrestrial communication pathway between the terminal and the central server such that the satellite receives burst messages sent from the terminal using a common air interface and forwards the burst messages to the central server;
   a terrestrial hub configured to provide an alternative terrestrial communication pathway between the terminal and central server such that the terrestrial hub directly receives burst messages sent from the terminal using the same common air interface and forwards the burst messages to the central server without the burst messages passing through the satellite.

8. The communication system of claim 7, wherein communication between the terminal and the central server is conducted either extraterrestrially through the satellite or terrestrially through the terrestrial hub without requiring the use of different common air interfaces for terrestrial and extraterrestrial communication.

9. The communication system of claim 7, wherein the communication between the terminal and central server is two-way and wherein both the satellite and terrestrial hub are configured to facilitate two-communication between the terminal and central server.

10. The communication system of claim 7, wherein burst messages communicated extraterrestrially through the satellite are sent on a transmit frequency band and burst messages communicated terrestrially through the terrestrial hub are sent on the same transmit frequency band.

11. The communication system of claim 7, wherein the central server is configured to set a terrestrial transmit power of the terminal to match needs of terrestrial reception through the terrestrial hub and an extraterrestrial transmit power of the terminal to match needs of extraterrestrial reception through the satellite.

12. The communication system of claim 7, wherein the central server further comprises an information element which includes scheduled transmission information and wherein the terminal is configured to communicate with the central server by sending a burst message at a pre-scheduled time such that the central server can derive a terminal identity for the terminal by comparing the time of the burst message with the scheduled transmission information in the information element without having to include terminal identity information in the burst message.

13. The communication system of claim 7, wherein the terminal is not required to be aware of whether communications between the terminal and the central server are communicated terrestrially or extraterrestrially.

14. A communication system, comprising:
    a terminal;
    a satellite in wireless communication with the terminal;
    a terrestrial hub in direct wireless communication with the terminal;
    wherein the terminal can communicate with a central server either extraterrestrially through the satellite or terrestrially through direct communication with the terrestrial hub using the same common air interface to communicate through either the satellite or the terrestrial hub.

15. The communication system of claim 14, wherein communication between the terminal and central server is conducted either extraterrestrially through the satellite or terrestrially through the terrestrial hub without requiring the use of different common air interfaces for terrestrial and extraterrestrial communication.

16. The communication system of claim 14, wherein the communication between the terminal and central server is two-way and wherein both the satellite and terrestrial hub are configured to facilitate two-communication between the terminal and central server.

17. The communication system of claim 14, wherein burst messages communicated extraterrestrially through the satellite are sent using a transmit frequency band burst messaged communicated terrestrially through the terrestrial hub are sent using the same transmit frequency band.

18. The communication system of claim 14, wherein the central server is configured to set a terrestrial transmit power of the terminal to match needs of terrestrial reception through the terrestrial hub and an extraterrestrial transmit power of the terminal to match needs of extraterrestrial reception through the satellite.

19. The communication system of claim 14, wherein the central server further comprises an information element which includes scheduled transmission information and wherein the terminal is configured to communicate with the central server by sending a burst message at a pre-scheduled time such that the central server can derive a terminal identity for the terminal by comparing the time of the burst message with the scheduled transmission information in the information element without having to include terminal identity information in the burst message.

20. The communication system of claim 14, wherein the terminal is not required to be aware of whether communications between the terminal and the central server are communicated terrestrially or extraterrestrially.

* * * * *